(12) United States Patent
Campbell et al.

(10) Patent No.: US 11,734,368 B1
(45) Date of Patent: Aug. 22, 2023

(54) SYSTEM AND METHOD FOR CREATING A CONSISTENT PERSONALIZED WEB EXPERIENCE ACROSS MULTIPLE PLATFORMS AND CHANNELS

(71) Applicant: Overstock.com, Inc., Midvale, UT (US)

(72) Inventors: Brian Campbell, Sandy, UT (US); Mike Hansen, South Jordan, UT (US); Naveen Ravindran, South Jordan, UT (US)

(73) Assignee: Overstock.com, Inc., Midvale, UT (US)

( * ) Notice: Subject to any disclaimer, the term of this patent is extended or adjusted under 35 U.S.C. 154(b) by 180 days.

(21) Appl. No.: 17/034,753

(22) Filed: Sep. 28, 2020

Related U.S. Application Data

(60) Provisional application No. 62/906,378, filed on Sep. 26, 2019.

(51) Int. Cl.
| | |
|---|---|
| *G06F 16/9535* | (2019.01) |
| *G06N 20/00* | (2019.01) |
| *G06N 5/04* | (2023.01) |
| *G06F 16/958* | (2019.01) |
| *G06Q 30/02* | (2023.01) |
| *G06Q 10/08* | (2023.01) |
| *G06Q 10/10* | (2023.01) |
| *G06F 9/54* | (2006.01) |

(Continued)

(52) U.S. Cl.
CPC ............ *G06F 16/9535* (2019.01); *G06F 9/547* (2013.01); *G06F 16/958* (2019.01); *G06F 40/186* (2020.01); *G06N 5/04* (2013.01); *G06N 20/00* (2019.01); *G06Q 10/087* (2013.01); *G06Q 10/107* (2013.01); *G06Q 30/0201* (2013.01); *G06Q 30/0202* (2013.01); *G06Q 30/0269* (2013.01); *G06Q 30/0276* (2013.01); *H04L 67/568* (2022.05); *G06Q 30/0273* (2013.01)

(58) Field of Classification Search
CPC .... G06F 16/9535; G06F 16/958; G06N 20/00; G06F 40/186; H04L 67/568; G06F 9/547; G06N 5/04; G06Q 10/087; G06Q 10/107; G06Q 30/0201; G06Q 30/0202; G06Q 30/0269; G06Q 30/0276; G06Q 30/0273
USPC .......................................................... 707/736
See application file for complete search history.

(56) References Cited

U.S. PATENT DOCUMENTS 3,573,747 A 4/1971 Adams et al.
3,581,072 A 5/1971 Nymeyer
(Continued)

FOREIGN PATENT DOCUMENTS

CA 2253543 10/1997
CA 2347812 5/2000
(Continued)

OTHER PUBLICATIONS

"Onsale joins fray as online shopping pcks up speed: Internet Booms," Comptuer Reseller News, Jun. 5, 1995.
(Continued)

*Primary Examiner* — Mohammad S Rostami
*Assistant Examiner* — Saba Ahmed
(74) *Attorney, Agent, or Firm* — Clayton Howarth, P.C.

(57) ABSTRACT

This disclosure relates generally to a system and method for creating unified personalized content for an individual user receiving communications from a given website across separate platforms and channels.

16 Claims, 7 Drawing Sheets

(51) Int. Cl.

| | |
|---|---|
| *G06F 40/186* | (2020.01) |
| *H04L 67/568* | (2022.01) |
| *G06Q 30/0251* | (2023.01) |
| *G06Q 30/0241* | (2023.01) |
| *G06Q 30/0202* | (2023.01) |
| *G06Q 30/0273* | (2023.01) |
| *G06Q 10/087* | (2023.01) |
| *G06Q 10/107* | (2013.01) |
| *G06Q 30/0201* | (2023.01) |

(56) References Cited

U.S. PATENT DOCUMENTS

| | | |
|---|---|---|
| 4,412,287 A | 10/1983 | Braddock, III |
| 4,674,044 A | 6/1987 | Kalmus et al. |
| 4,677,552 A | 6/1987 | Sibley, Jr. |
| 4,789,928 A | 12/1988 | Fujisaki |
| 4,799,156 A | 1/1989 | Shavit et al. |
| 4,808,987 A | 2/1989 | Takeda et al. |
| 4,823,265 A | 4/1989 | Nelson |
| 4,854,516 A | 8/1989 | Yamada |
| 4,903,201 A | 2/1990 | Wagner |
| RE33,316 E | 8/1990 | Katsuta et al. |
| 5,027,110 A | 6/1991 | Chang et al. |
| 5,053,956 A | 10/1991 | Donald et al. |
| 5,063,507 A | 11/1991 | Lindsey et al. |
| 5,077,665 A | 12/1991 | Silverman et al. |
| 5,101,353 A | 3/1992 | Lupien et al. |
| 5,136,501 A | 8/1992 | Silverman et al. |
| 5,168,446 A | 12/1992 | Wiseman |
| 5,205,200 A | 4/1993 | Wright |
| 5,243,515 A | 9/1993 | Lee |
| 5,258,908 A | 11/1993 | Hartheimer et al. |
| 5,280,422 A | 1/1994 | Moe et al. |
| 5,297,031 A | 3/1994 | Gutterman et al. |
| 5,297,032 A | 3/1994 | Trojan et al. |
| 5,301,350 A | 4/1994 | Rogan et al. |
| 5,305,200 A | 4/1994 | Hartheimer et al. |
| 5,325,297 A | 6/1994 | Bird et al. |
| 5,329,589 A | 7/1994 | Fraser et al. |
| 5,347,632 A | 9/1994 | Filepp et al. |
| 5,375,055 A | 12/1994 | Togher et al. |
| 5,377,354 A | 12/1994 | Scannell et al. |
| 5,394,324 A | 2/1995 | Clearwater |
| 5,407,433 A | 4/1995 | Loomas |
| 5,411,483 A | 5/1995 | Loomas et al. |
| 5,426,281 A | 6/1995 | Abecassis |
| 5,485,510 A | 1/1996 | Colbert |
| 5,493,677 A | 2/1996 | Balogh et al. |
| 5,553,145 A | 9/1996 | Micali |
| 5,557,728 A | 9/1996 | Garrett et al. |
| 5,579,471 A | 11/1996 | Barber et al. |
| 5,596,994 A | 1/1997 | Bro |
| 5,598,557 A | 1/1997 | Doner et al. |
| 5,621,790 A | 4/1997 | Grossman et al. |
| 5,640,569 A | 6/1997 | Miller et al. |
| 5,657,389 A | 8/1997 | Houvener |
| 5,664,111 A | 9/1997 | Nahan et al. |
| 5,664,115 A | 9/1997 | Fraser |
| 5,689,652 A | 11/1997 | Lupien et al. |
| 5,694,546 A | 12/1997 | Reisman |
| 5,706,457 A | 1/1998 | Dwyer et al. |
| 5,710,889 A | 1/1998 | Clark et al. |
| 5,715,314 A | 2/1998 | Payne et al. |
| 5,715,402 A | 2/1998 | Popolo |
| 5,717,989 A | 2/1998 | Tozzoli et al. |
| 5,721,908 A | 2/1998 | Lagarde et al. |
| 5,722,418 A | 3/1998 | Bro |
| 5,727,165 A | 3/1998 | Ordish et al. |
| 5,737,599 A | 4/1998 | Rowe et al. |
| 5,760,917 A | 6/1998 | Sheridan |
| 5,761,496 A | 6/1998 | Hattori |
| 5,761,655 A | 6/1998 | Hoffman |
| 5,761,662 A | 6/1998 | Dasan |
| 5,771,291 A | 6/1998 | Newton et al. |
| 5,771,380 A | 6/1998 | Tanaka et al. |
| 5,778,367 A | 7/1998 | Wesinger, Jr. et al. |
| 5,790,790 A | 8/1998 | Smith et al. |
| 5,794,216 A | 8/1998 | Brown |
| 5,794,219 A | 8/1998 | Brown |
| 5,796,395 A | 8/1998 | de Hond |
| 5,799,285 A | 8/1998 | Klingman |
| 5,803,500 A | 9/1998 | Mossberg |
| 5,818,914 A | 10/1998 | Fujisaki |
| 5,826,244 A | 10/1998 | Huberman |
| 5,835,896 A | 11/1998 | Fisher et al. |
| 5,845,265 A | 12/1998 | Woolston |
| 5,845,266 A | 12/1998 | Lupien et al. |
| 5,850,442 A | 12/1998 | Muftic |
| 5,870,754 A | 2/1999 | Dimitrova et al. |
| 5,872,848 A | 2/1999 | Romney et al. |
| 5,873,069 A | 2/1999 | Reuhl et al. |
| 5,873,080 A | 2/1999 | Coden et al. |
| 5,884,056 A | 3/1999 | Steele |
| 5,890,138 A | 3/1999 | Godin et al. |
| 5,890,175 A | 3/1999 | Wong et al. |
| 5,905,975 A | 5/1999 | Ausubel |
| 5,907,547 A | 5/1999 | Foladare et al. |
| 5,913,215 A | 6/1999 | Rubinstein et al. |
| 5,922,074 A | 7/1999 | Richard et al. |
| 5,924,072 A | 7/1999 | Havens |
| 5,926,794 A | 7/1999 | Fethe |
| 5,948,040 A | 9/1999 | DeLorme et al. |
| 5,948,061 A | 9/1999 | Merriman et al. |
| 5,970,490 A | 10/1999 | Morgenstern |
| 5,974,396 A | 10/1999 | Anderson et al. |
| 5,974,412 A | 10/1999 | Hazlehurst et al. |
| 5,986,662 A | 11/1999 | Argiro et al. |
| 5,987,446 A | 11/1999 | Corey et al. |
| 5,991,739 A | 11/1999 | Cupps et al. |
| 5,999,915 A | 12/1999 | Nahan et al. |
| 6,012,053 A | 1/2000 | Pant et al. |
| 6,029,141 A | 2/2000 | Bezos et al. |
| 6,035,288 A | 3/2000 | Solomon |
| 6,035,402 A | 3/2000 | Vaeth et al. |
| 6,044,363 A | 3/2000 | Mori et al. |
| 6,045,447 A | 4/2000 | Yoshizawa et al. |
| 6,047,264 A | 4/2000 | Fisher et al. |
| 6,049,797 A | 4/2000 | Guha et al. |
| 6,055,518 A | 4/2000 | Franklin et al. |
| 6,058,379 A | 5/2000 | Odom et al. |
| 6,058,417 A | 5/2000 | Hess et al. |
| 6,058,428 A | 5/2000 | Wang et al. |
| 6,061,448 A | 5/2000 | Smith et al. |
| 6,065,041 A | 5/2000 | Lum et al. |
| 6,070,125 A | 5/2000 | Murphy et al. |
| 6,073,117 A | 6/2000 | Oyanagi et al. |
| 6,078,914 A | 6/2000 | Redfern |
| 6,085,176 A | 7/2000 | Woolston |
| 6,104,815 A | 8/2000 | Alcorn et al. |
| 6,119,137 A | 9/2000 | Smith et al. |
| 6,128,649 A | 10/2000 | Smith et al. |
| 6,141,010 A | 10/2000 | Hoyle |
| 6,167,382 A | 12/2000 | Sparks et al. |
| 6,178,408 B1 | 1/2001 | Copple et al. |
| 6,185,558 B1 | 2/2001 | Bowman et al. |
| 6,192,407 B1 | 2/2001 | Smith et al. |
| 6,199,077 B1 | 3/2001 | Inala et al. |
| 6,202,051 B1 | 3/2001 | Woolston |
| 6,202,061 B1 | 3/2001 | Khosla et al. |
| 6,226,412 B1 | 5/2001 | Schwab |
| 6,243,691 B1 | 6/2001 | Fisher et al. |
| 6,269,238 B1 | 7/2001 | Iggulden |
| 6,271,840 B1 | 8/2001 | Finseth et al. |
| 6,275,820 B1 | 8/2001 | Navin-Chandra et al. |
| 6,275,829 B1 | 8/2001 | Angiulo et al. |
| 6,356,879 B2 | 3/2002 | Aggarwal et al. |
| 6,356,905 B1 | 3/2002 | Gershman et al. |
| 6,356,908 B1 | 3/2002 | Brown et al. |
| 6,366,899 B1 | 4/2002 | Kernz |
| 6,370,527 B1 | 4/2002 | Singhal |
| 6,373,933 B1 | 4/2002 | Sarkki et al. |
| 6,374,260 B1 | 4/2002 | Hoffert et al. |
| 6,381,510 B1 | 4/2002 | Amidhozour et al. |
| 6,415,270 B1 | 7/2002 | Rackson et al. |
| 6,415,320 B1 | 7/2002 | Hess et al. |
| 6,434,556 B1 | 8/2002 | Levin et al. |
| 6,452,609 B1* | 9/2002 | Katinsky et al. ... G06F 16/4387 709/219 |

(56) References Cited

U.S. PATENT DOCUMENTS

| | | |
|---|---|---|
| 6,456,307 B1 | 9/2002 | Bates et al. |
| 6,460,020 B1 | 10/2002 | Pool et al. |
| 6,466,917 B1 | 10/2002 | Goyal et al. |
| 6,484,149 B1 | 11/2002 | Jammes et al. |
| 6,489,968 B1 | 12/2002 | Ortega et al. |
| 6,522,955 B1 | 2/2003 | Colborn |
| 6,523,037 B1 | 2/2003 | Monahan et al. |
| 6,601,061 B1 | 7/2003 | Holt et al. |
| 6,604,107 B1 | 8/2003 | Wang |
| 6,625,764 B1 | 9/2003 | Dawson |
| 6,643,696 B2 | 11/2003 | Davis et al. |
| 6,661,431 B1 | 12/2003 | Stuart et al. |
| 6,665,838 B1 | 12/2003 | Brown et al. |
| 6,675,178 B1 | 1/2004 | Chinchar et al. |
| 6,694,436 B1 | 2/2004 | Audebert |
| 6,701,310 B1 | 3/2004 | Sugiura et al. |
| 6,718,536 B2 | 4/2004 | Dupaquis |
| 6,725,268 B1 | 4/2004 | Jackel et al. |
| 6,728,704 B2 | 4/2004 | Mao et al. |
| 6,732,161 B1 | 5/2004 | Hess et al. |
| 6,732,162 B1 | 5/2004 | Wood et al. |
| 6,801,909 B2 | 10/2004 | Delgado et al. |
| 6,856,963 B1 | 2/2005 | Hurwitz |
| 6,889,054 B2 | 5/2005 | Himmel et al. |
| 6,907,401 B1 | 6/2005 | Vittal et al. |
| 6,912,505 B2 | 6/2005 | Linden et al. |
| 6,978,273 B1 | 12/2005 | Bonneau et al. |
| 7,043,450 B2 | 5/2006 | Vélez et al. |
| 7,069,242 B1 | 6/2006 | Sheth et al. |
| 7,076,453 B2 | 7/2006 | Jammes et al. |
| 7,076,504 B1 | 7/2006 | Handel et al. |
| 7,080,030 B2 | 7/2006 | Eglen et al. |
| 7,099,891 B2 | 8/2006 | Harris et al. |
| 7,100,111 B2 | 8/2006 | McElfresh et al. |
| 7,100,195 B1 | 8/2006 | Underwood |
| 7,117,207 B1 | 10/2006 | Kerschberg et al. |
| 7,127,416 B1 | 10/2006 | Tenorio |
| 7,165,091 B2 | 1/2007 | Lunenfeld |
| 7,167,910 B2 | 1/2007 | Farnham et al. |
| 7,216,115 B1 | 5/2007 | Walters et al. |
| 7,240,016 B1 | 7/2007 | Sturgis et al. |
| 7,254,547 B1 | 8/2007 | Beck et al. |
| 7,305,614 B2 | 12/2007 | Chen et al. |
| 7,318,037 B2 | 1/2008 | Solari |
| 7,324,966 B2 | 1/2008 | Scheer |
| 7,340,249 B2 | 3/2008 | Moran et al. |
| 7,349,668 B2 | 3/2008 | Ilan et al. |
| 7,353,188 B2 | 4/2008 | Yim et al. |
| 7,366,755 B1 | 4/2008 | Cuomo et al. |
| 7,379,890 B2 | 5/2008 | Myr et al. |
| 7,380,217 B2 | 5/2008 | Gvelesiani |
| 7,383,320 B1 | 6/2008 | Silberstein et al. |
| 7,401,025 B1 | 7/2008 | Lokitz |
| 7,447,646 B1 | 11/2008 | Agarwal et al. |
| 7,451,476 B1 | 11/2008 | Banks et al. |
| 7,454,464 B2 | 11/2008 | Puthenkulam et al. |
| 7,457,730 B2 | 11/2008 | Degnan |
| 7,493,521 B1 | 2/2009 | Li et al. |
| 7,496,525 B1 | 2/2009 | Mitchell |
| 7,496,527 B2 | 2/2009 | Silverstein et al. |
| 7,496,582 B2 | 2/2009 | Farnham et al. |
| 7,516,094 B2 | 4/2009 | Perkowski |
| 7,539,696 B1 | 5/2009 | Greener et al. |
| 7,546,625 B1 | 6/2009 | Kamangar |
| 7,552,067 B2 | 6/2009 | Nephew et al. |
| 7,565,615 B2 | 7/2009 | Ebert |
| 7,606,743 B2 | 10/2009 | Orzell et al. |
| 7,610,212 B2 | 10/2009 | Klett et al. |
| 7,653,573 B2 | 1/2010 | Hayes, Jr. et al. |
| 7,834,883 B2 | 11/2010 | Adams et al. |
| 7,904,348 B2 | 3/2011 | Johnson et al. |
| 7,912,748 B1 | 3/2011 | Rosenberg et al. |
| 7,921,031 B2 | 4/2011 | Crysel et al. |
| 7,941,751 B2 | 5/2011 | Ebert |
| 7,979,340 B2 | 7/2011 | MacDonald Korth et al. |
| 7,983,950 B2 | 7/2011 | De Vita |
| 7,983,963 B2 | 7/2011 | Byrne et al. |
| 7,991,800 B2* | 8/2011 | Lawrence et al. . G06Q 30/0204 705/7.29 |
| 8,086,643 B1 | 12/2011 | Tenorio |
| 8,112,303 B2 | 2/2012 | Eglen et al. |
| 8,140,989 B2 | 3/2012 | Cohen et al. |
| 8,166,155 B1 | 4/2012 | Rachmeler et al. |
| 8,204,799 B1 | 6/2012 | Murray et al. |
| 8,214,264 B2 | 7/2012 | Kasavin et al. |
| 8,214,804 B2 | 7/2012 | Robertson |
| 8,260,852 B1 | 9/2012 | Cselle |
| 8,312,056 B1 | 11/2012 | Peng et al. |
| 8,326,662 B1 | 12/2012 | Byrne et al. |
| 8,370,269 B2 | 2/2013 | MacDonald-Korth et al. |
| 8,370,435 B1 | 2/2013 | Bonefas et al. |
| 8,392,356 B2 | 3/2013 | Stoner et al. |
| 8,452,691 B2 | 5/2013 | MacDonald Korth et al. |
| 8,473,316 B1 | 6/2013 | Panzitta et al. |
| 8,494,912 B2 | 7/2013 | Fraser et al. |
| 8,545,265 B2 | 10/2013 | Sakamoto et al. |
| 8,577,740 B1 | 11/2013 | Murray et al. |
| 8,583,480 B2 | 11/2013 | Byrne |
| 8,630,960 B2 | 1/2014 | Gross |
| 8,676,632 B1 | 3/2014 | Watson et al. |
| 8,693,494 B2 | 4/2014 | Fiatal |
| 8,719,075 B2 | 5/2014 | MacDonald Korth et al. |
| 8,793,650 B2 | 7/2014 | Hilerio et al. |
| 9,047,341 B2 | 6/2015 | Pan |
| 9,047,642 B2 | 6/2015 | Byrne et al. |
| 9,448,692 B1 | 9/2016 | Mierau et al. |
| 9,483,788 B2 | 11/2016 | Martin |
| 9,741,080 B1 | 8/2017 | Byrne |
| 9,747,622 B1 | 8/2017 | Johnson et al. |
| 9,805,425 B2 | 10/2017 | MacDonald Korth et al. |
| 9,928,752 B2 | 3/2018 | Byrne et al. |
| 9,940,659 B1 | 4/2018 | Behbahani et al. |
| 10,074,118 B1 | 9/2018 | Johnson et al. |
| 10,102,287 B2 | 10/2018 | Martin |
| 10,269,081 B1 | 4/2019 | Byrne |
| 10,423,997 B2 | 9/2019 | MacDonald Korth et al. |
| 10,534,845 B2 | 1/2020 | Noursalehi et al. |
| 10,769,219 B1 | 9/2020 | Martin |
| 10,810,654 B1 | 10/2020 | Robertson et al. |
| 10,853,891 B2 | 12/2020 | MacDonald-Korth et al. |
| 10,872,350 B1 | 12/2020 | Hu et al. |
| 11,061,977 B1* | 7/2021 | Raskar .............. H04N 21/4532 |
| 2001/0014868 A1 | 8/2001 | Herz et al. |
| 2001/0034667 A1 | 10/2001 | Petersen |
| 2001/0034668 A1 | 10/2001 | Whitworth |
| 2001/0044751 A1 | 11/2001 | Pugliese, III et al. |
| 2001/0047290 A1 | 11/2001 | Petras et al. |
| 2001/0047308 A1 | 11/2001 | Kaminsky et al. |
| 2001/0051996 A1 | 12/2001 | Cooper et al. |
| 2002/0002513 A1 | 1/2002 | Chiasson |
| 2002/0007356 A1 | 1/2002 | Rice et al. |
| 2002/0013721 A1 | 1/2002 | Dabbiere et al. |
| 2002/0019763 A1 | 2/2002 | Linden et al. |
| 2002/0022995 A1 | 2/2002 | Miller et al. |
| 2002/0023059 A1 | 2/2002 | Bari et al. |
| 2002/0026390 A1 | 2/2002 | Ulenas et al. |
| 2002/0029187 A1 | 3/2002 | Meehan et al. |
| 2002/0038312 A1 | 3/2002 | Donner et al. |
| 2002/0040352 A1 | 4/2002 | McCormick |
| 2002/0042738 A1 | 4/2002 | Srinivasan et al. |
| 2002/0049622 A1 | 4/2002 | Lettich et al. |
| 2002/0056044 A1 | 5/2002 | Andersson |
| 2002/0099578 A1 | 7/2002 | Eicher, Jr. et al. |
| 2002/0099579 A1 | 7/2002 | Stowell et al. |
| 2002/0099602 A1 | 7/2002 | Moskowitz et al. |
| 2002/0107718 A1 | 8/2002 | Morrill et al. |
| 2002/0107853 A1 | 8/2002 | Hofmann et al. |
| 2002/0111826 A1 | 8/2002 | Potter et al. |
| 2002/0120537 A1 | 8/2002 | Morea et al. |
| 2002/0123957 A1 | 9/2002 | Notarius et al. |
| 2002/0124100 A1 | 9/2002 | Adams |
| 2002/0129282 A1 | 9/2002 | Hopkins |
| 2002/0133502 A1 | 9/2002 | Rosenthal et al. |
| 2002/0138399 A1 | 9/2002 | Hayes et al. |
| 2002/0147625 A1 | 10/2002 | Kolke, Jr. |
| 2002/0156802 A1 | 10/2002 | Takayama et al. |
| 2002/0161648 A1 | 10/2002 | Mason et al. |
| 2002/0188777 A1 | 12/2002 | Kraft et al. |

(56) References Cited

U.S. PATENT DOCUMENTS

| | | |
|---|---|---|
| 2002/0194049 A1 | 12/2002 | Boyd |
| 2002/0198784 A1 | 12/2002 | Shaak et al. |
| 2002/0198882 A1 | 12/2002 | Linden et al. |
| 2003/0004855 A1 | 1/2003 | Dutta et al. |
| 2003/0005046 A1 | 1/2003 | Kavanagh et al. |
| 2003/0009362 A1 | 1/2003 | Cifani et al. |
| 2003/0009392 A1 | 1/2003 | Perkowski |
| 2003/0014400 A1 | 1/2003 | Siegel |
| 2003/0028451 A1 | 2/2003 | Ananian |
| 2003/0028605 A1 | 2/2003 | Millett et al. |
| 2003/0032409 A1 | 2/2003 | Hutcheson et al. |
| 2003/0035138 A1 | 2/2003 | Schilling |
| 2003/0036914 A1 | 2/2003 | Fitzpatrick et al. |
| 2003/0040970 A1 | 2/2003 | Miller |
| 2003/0041008 A1 | 2/2003 | Grey et al. |
| 2003/0046149 A1 | 3/2003 | Wong |
| 2003/0069740 A1 | 4/2003 | Zeidman |
| 2003/0069790 A1 | 4/2003 | Kane |
| 2003/0069825 A1 | 4/2003 | Hoffman et al. |
| 2003/0083961 A1 | 5/2003 | Bezos et al. |
| 2003/0088467 A1 | 5/2003 | Culver |
| 2003/0088511 A1 | 5/2003 | Karboulonis et al. |
| 2003/0093331 A1 | 5/2003 | Childs et al. |
| 2003/0097352 A1 | 5/2003 | Gutta et al. |
| 2003/0105682 A1 | 6/2003 | Dicker et al. |
| 2003/0110100 A1 | 6/2003 | Wirth, Jr. |
| 2003/0119492 A1 | 6/2003 | Timmins et al. |
| 2003/0131095 A1 | 7/2003 | Kumhyr et al. |
| 2003/0139969 A1 | 7/2003 | Scroggie et al. |
| 2003/0140007 A1 | 7/2003 | Kramer et al. |
| 2003/0140121 A1 | 7/2003 | Adams |
| 2003/0158792 A1 | 8/2003 | Perkowski |
| 2003/0163340 A1 | 8/2003 | Fitzpatrick et al. |
| 2003/0167213 A1 | 9/2003 | Jammes et al. |
| 2003/0167222 A1 | 9/2003 | Mehrotra et al. |
| 2003/0177103 A1 | 9/2003 | Ivanov et al. |
| 2003/0187745 A1 | 10/2003 | Hobday et al. |
| 2003/0200156 A1 | 10/2003 | Roseman et al. |
| 2003/0204449 A1 | 10/2003 | Kotas et al. |
| 2003/0217002 A1 | 11/2003 | Enborg |
| 2003/0220835 A1 | 11/2003 | Barnes, Jr. et al. |
| 2004/0006509 A1 | 1/2004 | Mannik et al. |
| 2004/0015416 A1 | 1/2004 | Foster et al. |
| 2004/0029567 A1 | 2/2004 | Timmins et al. |
| 2004/0041836 A1 | 3/2004 | Zaner et al. |
| 2004/0044563 A1 | 3/2004 | Stein |
| 2004/0055017 A1 | 3/2004 | Delpuch et al. |
| 2004/0058710 A1 | 3/2004 | Timmins et al. |
| 2004/0073476 A1 | 4/2004 | Donahue et al. |
| 2004/0078388 A1 | 4/2004 | Melman |
| 2004/0107136 A1 | 6/2004 | Nemirofsky et al. |
| 2004/0117242 A1 | 6/2004 | Conrad et al. |
| 2004/0122083 A1 | 6/2004 | Pettit et al. |
| 2004/0122681 A1 | 6/2004 | Ruvolo et al. |
| 2004/0122735 A1 | 6/2004 | Meshkin |
| 2004/0122855 A1 | 6/2004 | Ruvolo et al. |
| 2004/0128183 A1 | 7/2004 | Challey et al. |
| 2004/0128283 A1 | 7/2004 | Wang et al. |
| 2004/0128320 A1 | 7/2004 | Grove et al. |
| 2004/0143731 A1 | 7/2004 | Audebert et al. |
| 2004/0148232 A1 | 7/2004 | Fushimi et al. |
| 2004/0172323 A1 | 9/2004 | Stamm |
| 2004/0172379 A1 | 9/2004 | Mott et al. |
| 2004/0174979 A1 | 9/2004 | Hutton et al. |
| 2004/0186766 A1 | 9/2004 | Fellenstein et al. |
| 2004/0199496 A1 | 10/2004 | Liu et al. |
| 2004/0199905 A1 | 10/2004 | Fagin et al. |
| 2004/0204989 A1 | 10/2004 | Dicker et al. |
| 2004/0204991 A1 | 10/2004 | Monahan et al. |
| 2004/0230989 A1 | 11/2004 | Macey et al. |
| 2004/0240642 A1 | 12/2004 | Crandell et al. |
| 2004/0249727 A1 | 12/2004 | Cook, Jr. et al. |
| 2004/0267717 A1 | 12/2004 | Slackman |
| 2005/0002166 A1 | 1/2005 | Clidaras et al. |
| 2005/0010925 A1 | 1/2005 | Khawand et al. |
| 2005/0038733 A1 | 2/2005 | Foster et al. |
| 2005/0044254 A1 | 2/2005 | Smith |
| 2005/0055306 A1 | 3/2005 | Miller et al. |
| 2005/0060664 A1 | 3/2005 | Rogers |
| 2005/0097204 A1 | 5/2005 | Horowitz et al. |
| 2005/0114229 A1 | 5/2005 | Ackley et al. |
| 2005/0120311 A1 | 6/2005 | Thrall |
| 2005/0131837 A1 | 6/2005 | Sanctis et al. |
| 2005/0144064 A1 | 6/2005 | Calabria et al. |
| 2005/0193333 A1 | 9/2005 | Ebert |
| 2005/0197846 A1 | 9/2005 | Pezaris et al. |
| 2005/0197950 A1 | 9/2005 | Moya et al. |
| 2005/0198031 A1 | 9/2005 | Pezaris et al. |
| 2005/0202390 A1 | 9/2005 | Allen et al. |
| 2005/0203888 A1 | 9/2005 | Woosley et al. |
| 2005/0216300 A1 | 9/2005 | Appelman et al. |
| 2005/0262067 A1 | 11/2005 | Lee et al. |
| 2005/0273378 A1 | 12/2005 | MacDonald-Korth et al. |
| 2006/0009994 A1 | 1/2006 | Hogg et al. |
| 2006/0010105 A1 | 1/2006 | Sarukkai et al. |
| 2006/0015498 A1 | 1/2006 | Sarmiento et al. |
| 2006/0031240 A1 | 2/2006 | Eyal et al. |
| 2006/0041638 A1 | 2/2006 | Whittaker et al. |
| 2006/0058048 A1 | 3/2006 | Kapoor et al. |
| 2006/0069623 A1 | 3/2006 | MacDonald Korth et al. |
| 2006/0085251 A1 | 4/2006 | Greene |
| 2006/0173817 A1 | 8/2006 | Chowdhury et al. |
| 2006/0206479 A1 | 9/2006 | Mason |
| 2006/0218049 A1 | 9/2006 | Walker et al. |
| 2006/0230035 A1 | 10/2006 | Bailey et al. |
| 2006/0235752 A1 | 10/2006 | Kavanagh et al. |
| 2006/0259360 A1 | 11/2006 | Flinn et al. |
| 2006/0271671 A1 | 11/2006 | Hansen |
| 2006/0282304 A1 | 12/2006 | Bedard et al. |
| 2007/0005424 A1 | 1/2007 | Arauz |
| 2007/0027760 A1 | 2/2007 | Collins et al. |
| 2007/0027814 A1 | 2/2007 | Tuoriniemi |
| 2007/0073641 A1 | 3/2007 | Perry et al. |
| 2007/0077025 A1 | 4/2007 | Mino |
| 2007/0078726 A1 | 4/2007 | MacDonald Korth et al. |
| 2007/0078849 A1 | 4/2007 | Slothouber |
| 2007/0083437 A1 | 4/2007 | Hamor |
| 2007/0094597 A1 | 4/2007 | Rostom |
| 2007/0100803 A1 | 5/2007 | Cava |
| 2007/0130090 A1 | 6/2007 | Staib et al. |
| 2007/0160345 A1 | 7/2007 | Sakai et al. |
| 2007/0162379 A1 | 7/2007 | Skinner |
| 2007/0174108 A1 | 7/2007 | Monster |
| 2007/0192168 A1 | 8/2007 | Van Luchene |
| 2007/0192181 A1 | 8/2007 | Asdourian |
| 2007/0206606 A1 | 9/2007 | Coleman et al. |
| 2007/0214048 A1 | 9/2007 | Chan et al. |
| 2007/0226679 A1 | 9/2007 | Jayamohan et al. |
| 2007/0233565 A1 | 10/2007 | Herzog et al. |
| 2007/0239534 A1 | 10/2007 | Liu et al. |
| 2007/0245013 A1 | 10/2007 | Saraswathy et al. |
| 2007/0260520 A1 | 11/2007 | Jha et al. |
| 2007/0282666 A1 | 12/2007 | Afeyan et al. |
| 2007/0288298 A1 | 12/2007 | Gutierrez et al. |
| 2007/0299743 A1 | 12/2007 | Staib et al. |
| 2008/0015938 A1 | 1/2008 | Haddad et al. |
| 2008/0021763 A1 | 1/2008 | Merchant |
| 2008/0052152 A1 | 2/2008 | Yufik |
| 2008/0071640 A1 | 3/2008 | Nguyen |
| 2008/0082394 A1 | 4/2008 | Floyd et al. |
| 2008/0103893 A1 | 5/2008 | Nagarajan et al. |
| 2008/0120342 A1 | 5/2008 | Reed et al. |
| 2008/0126205 A1 | 5/2008 | Evans et al. |
| 2008/0126476 A1 | 5/2008 | Nicholas et al. |
| 2008/0133305 A1 | 6/2008 | Yates et al. |
| 2008/0140765 A1 | 6/2008 | Kelaita et al. |
| 2008/0162574 A1 | 7/2008 | Gilbert |
| 2008/0195476 A1 | 8/2008 | Marchese et al. |
| 2008/0201218 A1 | 8/2008 | Broder et al. |
| 2008/0215456 A1 | 9/2008 | West et al. |
| 2008/0288338 A1 | 11/2008 | Wiseman et al. |
| 2008/0294536 A1 | 11/2008 | Taylor et al. |
| 2008/0300909 A1 | 12/2008 | Rikhtverchik et al. |
| 2008/0301009 A1 | 12/2008 | Plaster et al. |
| 2008/0305869 A1 | 12/2008 | Konforty et al. |
| 2008/0313010 A1 | 12/2008 | Jepson et al. |
| 2009/0006190 A1 | 1/2009 | Lucash et al. |
| 2009/0030755 A1 | 1/2009 | Altberg et al. |

(56) References Cited

U.S. PATENT DOCUMENTS

| | | | |
|---|---|---|---|
| 2009/0030775 A1 | 1/2009 | Vieri |
| 2009/0037355 A1 | 2/2009 | Brave et al. |
| 2009/0106080 A1 | 4/2009 | Carrier et al. |
| 2009/0106127 A1 | 4/2009 | Purdy et al. |
| 2009/0110181 A1 | 4/2009 | Koenig et al. |
| 2009/0119167 A1 | 5/2009 | Kendall et al. |
| 2009/0157537 A1 | 6/2009 | Miller |
| 2009/0164323 A1 | 6/2009 | Byrne |
| 2009/0182589 A1 | 7/2009 | Kendall et al. |
| 2009/0204848 A1 | 8/2009 | Kube et al. |
| 2009/0222348 A1 | 9/2009 | Ransom et al. |
| 2009/0222737 A1 | 9/2009 | Liesche et al. |
| 2009/0234722 A1 | 9/2009 | Evevsky |
| 2009/0240582 A1 | 9/2009 | Sheldon-Neal et al. |
| 2009/0276284 A1 | 11/2009 | Yost |
| 2009/0276305 A1 | 11/2009 | Clopp |
| 2009/0292677 A1 | 11/2009 | Kim |
| 2009/0293019 A1 | 11/2009 | Raffel et al. |
| 2009/0313173 A1 | 12/2009 | Singh et al. |
| 2010/0042684 A1 | 2/2010 | Broms et al. |
| 2010/0070448 A1 | 3/2010 | Omoigui |
| 2010/0076816 A1 | 3/2010 | Phillips |
| 2010/0076851 A1 | 3/2010 | Jewell, Jr. |
| 2010/0094673 A1 | 4/2010 | Lobo et al. |
| 2010/0107123 A1 | 4/2010 | Sareen et al. |
| 2010/0145831 A1 | 6/2010 | Esfandiari et al. |
| 2010/0146413 A1 | 6/2010 | Yu |
| 2010/0228617 A1 | 9/2010 | Ransom et al. |
| 2011/0010656 A1 | 1/2011 | Mokotov |
| 2011/0055054 A1 | 3/2011 | Glasson |
| 2011/0060621 A1 | 3/2011 | Weller et al. |
| 2011/0103699 A1 | 5/2011 | Ke et al. |
| 2011/0131253 A1 | 6/2011 | Peukert et al. |
| 2011/0145226 A1 | 6/2011 | Gollapudi et al. |
| 2011/0153383 A1 | 6/2011 | Bhattacharjya et al. |
| 2011/0153663 A1 | 6/2011 | Koren et al. |
| 2011/0173076 A1 | 7/2011 | Eggleston et al. |
| 2011/0191319 A1 | 8/2011 | Nie et al. |
| 2011/0196802 A1 | 8/2011 | Ellis et al. |
| 2011/0225050 A1 | 9/2011 | Varghese |
| 2011/0231226 A1 | 9/2011 | Golden |
| 2011/0231383 A1 | 9/2011 | Smyth et al. |
| 2011/0258049 A1 | 10/2011 | Ramer et al. |
| 2011/0271204 A1 | 11/2011 | Jones et al. |
| 2011/0276513 A1 | 11/2011 | Erhart et al. |
| 2011/0289068 A1 | 11/2011 | Teevan et al. |
| 2012/0005187 A1 | 1/2012 | Chavanne |
| 2012/0030067 A1 | 2/2012 | Pothukuchi et al. |
| 2012/0084135 A1 | 4/2012 | Nissan et al. |
| 2012/0158715 A1 | 6/2012 | Maghoul et al. |
| 2012/0164619 A1 | 6/2012 | Meer |
| 2012/0166299 A1 | 6/2012 | Heinstein et al. |
| 2012/0231424 A1 | 9/2012 | Calman et al. |
| 2012/0233312 A1 | 9/2012 | Ramakumar et al. |
| 2012/0278388 A1 | 11/2012 | Kleinbart et al. |
| 2012/0284336 A1 | 11/2012 | Schmidt et al. |
| 2013/0031470 A1 | 1/2013 | Daly, Jr. et al. |
| 2013/0073392 A1 | 3/2013 | Allen et al. |
| 2013/0080200 A1 | 3/2013 | Connolly et al. |
| 2013/0080426 A1 | 3/2013 | Chen et al. |
| 2013/0085893 A1 | 4/2013 | Bhardwaj et al. |
| 2013/0144870 A1 | 6/2013 | Gupta et al. |
| 2013/0145254 A1 | 6/2013 | Masuko et al. |
| 2013/0151331 A1 | 6/2013 | Avner et al. |
| 2013/0151388 A1 | 6/2013 | Falkenborg et al. |
| 2013/0185164 A1 | 7/2013 | Pottjegort |
| 2013/0191409 A1 | 7/2013 | Zeng et al. |
| 2013/0254059 A1 | 9/2013 | Teo |
| 2013/0268561 A1 | 10/2013 | Christie et al. |
| 2014/0019313 A1 | 1/2014 | Hu et al. |
| 2014/0019542 A1* | 1/2014 | Rao et al. ............... G06Q 50/01 709/204 |
| 2014/0025509 A1 | 1/2014 | Reisz et al. |
| 2014/0032544 A1 | 1/2014 | Mathieu et al. |
| 2014/0114680 A1 | 4/2014 | Mills et al. |
| 2014/0136290 A1 | 5/2014 | Schiestl et al. |
| 2014/0172652 A1 | 6/2014 | Pobbathi et al. |
| 2014/0180758 A1 | 6/2014 | Agarwal et al. |
| 2014/0200959 A1 | 7/2014 | Sarb et al. |
| 2014/0259056 A1 | 9/2014 | Grusd |
| 2014/0289005 A1 | 9/2014 | Laing et al. |
| 2014/0337090 A1 | 11/2014 | Tavares |
| 2014/0372415 A1 | 12/2014 | Fernandez-Ruiz |
| 2015/0019958 A1 | 1/2015 | Ying et al. |
| 2015/0088968 A1* | 3/2015 | Wei et al. ............... G06F 9/54 709/203 |
| 2015/0142543 A1 | 5/2015 | Lellouche |
| 2015/0286742 A1 | 10/2015 | Zhang et al. |
| 2015/0287066 A1 | 10/2015 | Wortley et al. |
| 2017/0344622 A1 | 11/2017 | Islam et al. |
| 2020/0065357 A1 | 2/2020 | Noursalehi et al. |
| 2020/0293587 A1* | 9/2020 | Ayers et al. ......... G06F 40/205 |

FOREIGN PATENT DOCUMENTS

| | | | |
|---|---|---|---|
| EP | 0636993 | B1 | 4/1999 |
| EP | 0807891 | B1 | 5/2000 |
| EP | 1241603 | A1 | 9/2002 |
| GB | 2397400 | A | 7/2004 |
| GB | 2424098 | A | 9/2006 |
| JP | 2001283083 | A | 10/2001 |
| JP | 2002318935 | A | 10/2002 |
| JP | 2007021920 | A | 2/2007 |
| JP | 2009505238 | | 2/2009 |
| WO | 1997017663 | A1 | 5/1997 |
| WO | 1998032289 | A2 | 7/1998 |
| WO | 1998047082 | A1 | 10/1998 |
| WO | 1998049641 | A1 | 11/1998 |
| WO | 1999059283 | A1 | 11/1999 |
| WO | 2000025218 | A1 | 5/2000 |
| WO | 2001009803 | A1 | 2/2001 |
| WO | 2001082135 | A1 | 11/2001 |
| WO | 2001097099 | A1 | 12/2001 |
| WO | 2002037234 | A2 | 5/2002 |
| WO | 2003094080 | A1 | 11/2003 |
| WO | 2007021920 | A2 | 2/2007 |
| WO | 2012093410 | A2 | 7/2012 |
| WO | 2015116038 | A1 | 8/2015 |
| WO | 2015176071 | A2 | 11/2015 |

OTHER PUBLICATIONS

"Mediappraise: Mediappraise Receives National Award for Web-Based Technology That Enables Companies to Solve Thorny HR Problem," Dec. 14, 1998.

2roam, inc., multiple archived pages of www.2roam.com retrieved via Internet Archive Wayback Machine on Jun. 10, 2008.

Alex, Neil, " Optimizing Search Results in Elasticsearch with Scoring and Boosting", Mar. 18, 2015, Qbox.io, accessed at [https://qbox.io/blog/optimizing-search-results-in-elasticsearch0with-scoring-and-boosting] (year: 2015).

ALT et al., "Bibliography on Electronic Commerce," Electronic Markets - The International Journal, Oct. 1993, 5 pgs. vol. 3, No. 3.

ALT et al., "Computer Integrated Logistics," Electronic Markets - The International Journal, Oct. 1993, 1 pg. vol. 1, No. 3.

Anonymous, "Image manipulation (image-editing software and image-manipulation systems)(Seybold Special Report, Part II), Seybold Report on Publishing Systems, May 15, 1995, pS35(9), vol. 24, No. 18.

Auctionwatch.com, multiple pages - including search results for "expedition," printed Apr. 21, 2011.

Auctiva.come, multiple pages, undated but website copyright date is "1999-2000.".

Ball et al., "Supply chain infrastructures: system integration and information sharing," ACM Sigmod Record, 2002, vol. 31, No. 1, pp. 61-66.

Berger et al., "Random Ultiple-Access Communication and Group Testing," IEEE, 1984.

Braganza, "IS Resarch at Cranfield - A Look at the Future," Electronic Markets - The International Journal, Oct. 1993, 1 pg. vol. 3, No. 3.

Brecht et al., "The IM 2000 Research Programme," Electronic Markets - The International Journal, Oct. 1993, 1 pg. vol. 3, No. 3.

(56) References Cited

OTHER PUBLICATIONS

Business Wire business editors/high-tech writers, "2Roam Drives Hertz to the Wireless Web: Number One Car Rental Company to Provide Customers Wireless Access from Any Device," Business Wire, Aug. 7, 2001.
Business Wire business editors/high-tech writers, "2Roam Partners with Pumatech to Delivery Wireless Alerts," Business Wire, Dec. 18, 2000.
Business Wire business editors/high-tech writers, "2Roam Takes eHow's How-to Solutions Wireless: With 2Roam, he Web's One-Stop Source for getting Things Done is on More Wireless Devices, with Ability to Purchase Its Products from Anywhere," Business Wire, Oct. 2, 2000.
Business Wire business editors/high-tech writers, "PictureWorks Technology, Inc. Expands in Real Estate Market with Adoption of Rimfire on Reator.com," Business Wire, Nov. 8, 1999.
Business Wire business editors/high-tech writers, "PictureWorks Technology, Inc. Shows Strong Revenue Growth in Internet Imaging Business," Business Wire, Nov. 10, 1999.
Business Wire business/technology editors, "Sellers Flock to OutletZoo.com as New Automatic Price Drop Method Moves Excess Inventory Online," Business Wire, Oct. 25, 1999.
Buy.com, www.buy.com homepage, printed Oct. 13, 2004.
Chen et al., "Detecting Web Page Structure for Adaptive Viewing on Small Form Factor Devices," ACM, May 20-24, 2003.
Chen, M. (2007). Knowledge assisted data management and retrieval in multimedia database systems (Order No. 3268643).
Clarke, "Research Programme in Supra-organizational Systems," Electronic Markets - The International Journal, Oct. 1993, 2 pgs. vol. 3, No. 3.
Clemons et al., "Evaluating the prospects for alternative electronic securities markets," Proceedings of the twelfth International conference on information systems, New York, New York, United States, pp. 53-64, 1991.
Fan, J., Keim, F.A., Gao, Y., Luo, H. and Li, Z. (2009). JustClick: Personalized Image Recommendation via Exploratory Search from Large-Scale Flickr Images. Feb. 2009. IEEE Transactions on Circuits and Systems for Video Technology, 19(2), pp. 2730288. (Year: 2009).
Friendster.com, homepage and "more info" pages, printed Apr. 29, 2004.
Gallagher et al. "A framework for targeting banner advertising on the internet. IEEE, pp. 265-274 (Year: 1997).
Google News archive search for "2Roam marketing" performed over the date range 2000-2003.
Google News archive search for "2Roam SMS" performed over the date range 2000-2008.
Grabowski et al., "Mobile-enabled grid middleware and/or grid gateways," GridLab - A Grid Application Toolkit and Testbed, Work Package 12 - Access for Mobile Users, Jun. 3, 2003.
Graham, "The Emergence of Linked Fish Markets in Europe," Electronic Markets - The International Journal, Jul. 1993, 4 pgs. vol. 8, No. 2.
Gunthorpe et al., "Portfolio Composition and the Investment Horizon," Financial Analysts Journal, Jan. 1994 -Feb. 1994, pp. 51-56.
Halperin, "Toward a Process Handbook for Organizational Coordination Processes," Electronic Markets - The International Journal, Oct. 1993, 1 pg. vol. 3, No. 3.
Hess et al., "Computerized Loan Origination Systems: An Industry Case Study of the Electronic Markets Hypothesis," MIS Quarterly, Sep. 1994, pp. 251-275.
IBM, "Anyonymous Delivery of Goods in Electronic Commerce," IBM Technical Disclosure Bulletin, Mar. 1996, pp. 363-366, vol. 39, No. 3.
IBM, "Personal Optimized Decision/Transaction Program," IBM Technical Disclosure Bulletin, Jan. 1995, pp. 83-84, vol. 38, No. 1.
Icrossing, "Icrossing Search Synergy: Natural & Paid Search Symbiosis," Mar. 2007.

IEEE 100 - The Authoritative Dictionary of IEEE Standard Terms, Seventh Edition, 2000. Entire book cited; table of contents, source list, and terms beginning with A included. ISBN 0-7381-2601-2a.
Ives et al., "Editor's Comments - MISQ Central: Creating a New Intellectual Infrastructure," MIS Quarterly, Sep. 1994, pg. xxxv.
Jbid.com, "Can I track all of my bids from My Page?" printed from web.archive.org/web/20010208114049/www.ubid. com/help/topic14.asp on Aug. 30, 2007.
Jbid.com, "How do I track my shipment?" printed from web.archive.org/web/20010331032659/www.ubid.com/help/ topic27.asp on Aug. 30, 2007.
Jbid.com, "How do I Updated my Address, Phone, Credit Card, Password, etc.?" printed from web.archive.org/ web/ 20010208113903/www.ubid.com/help/topic13asp on Aug. 30, 2007.
Joshi, "Information visibility and its effect on supply chain dynamics," Ph.D. dissertation, Massachusetts Institute of Technology, 2000 (fig. 4.5; pg. 45).
Jvarbelow et al., "Aucnet: Tv Auction Network System," Harvard Business School 9-190-001, Jul. 19, 1989, Rev. Apr. 12, 1996, pp. 1-15.
Klein, "Information Logistics," Electronic Markets - The International Journal, Oct. 1993, pp. 11-12, vol. 3, No. 3.
Klein, "Introduction to Electronic Auctions," Electronic Markets - The International Journal, Dec. 1997, 4 pgs. vol. 7, No. 4.
Kubicek, "The Organization Gap," Electronic Markets - The International Journal, Oct. 1993, 1 pg. vol. 3, No. 3.
Kuula, "Telematic Services in Finland," Electronic Markets - The International Journal, Oct. 1993, 1 pg. vol. 3, No. 3.
Lalonde, "The EDI World Institute: An International Approach," Electronic Markets - The International Journal, Oct. 1993, 1 pg. vol. 3, No. 3.
Lee et al., "Electronic Brokerage and Electronic Auction: The Impact of IT on Market Structures," Proceedings of the 29th Annual Hawaii International Conference on System Sciences, 1996, pp. 397-406.
Lee et al., "Intelligent Electronic Trading for Commodity Exchanges," Electronic Markets - The International Journal, Oct. 1993, 2 pgs. vol. 3, No. 3.
Lee, "Aucnet: Electronic Intermediary for Used-Car Transactions," Electronic Market - The International Journal, Dec. 1997, pp. 24-28, vol. 7, No. 4.
Levy, Michael, and Dhruv Grewal. "Supply chain management in a networked economy." Journal Retailing 76.4 (2000): 415-429.
LIVE365 press release, "Live365 to Offer Opt-In Advertising on Its Website," Oct. 15, 2004.
London Business School, "Overture and Google: Internet Pay-Per-Click (PPC) Advertising Options," Mar. 2003.
M2 Presswire, "Palm, Inc.: Palm unveils new web browser optimised for handhelds; HTML browser offers highspeed web-browsing option," Mar. 13, 2002.
Malone et al., "Electronic Markets and Electronic Hierarchies," Communications of the ACM, Jun. 1987, pp. 484-497, vol. 30, No. 6.
Mansell et al., "Electronic Trading Networks: The Route to Competitive Advantage?" Electronic Markets - The International Journal, Oct. 1993, 1 pg. vol. 3, No. 3.
Mardesich, "Onsale takes auction gavel electronic," Computer Reseller News, Jul. 8, 1996, pp. 2, 32.
Marteau, "Shop with One Click, Anywhere, Anytime," Information Management and Consulting, 2000, pp. 44-46, vol. 15, No. 4.
Massimb et al., "Electronic Trading, Market Structure and Liquidity," Financial Analysts Journal, Jan.-Feb., 1994, pp. 39-49.
Mcginnity, "Build Your Weapon," PC Magazine, Apr. 24, 2011, printed from www.pcmag.com/print_article2?0,1217, a%253D3955,00.asp.
Meade, "Visual 360: a performance appraisal system that's 'fun,'" HR Magazine, 44, 7, 118(3), Jul. 1999.
Medvinsky et al., "Electronic Currency for the Internet," Electronic Markets - The International Journal, Oct. 1993, 2 pgs. vol. 3, No. 3.
Message Passing from Wikipedia, archived May 6, 2016, retrieved from https://en.wikipedia.org/wiki/ message_passing, 4 pgs.

(56) References Cited

OTHER PUBLICATIONS

Metails.Com, www.metails.com homepage, printed Oct. 13, 2004.
Microsoft Computer Dictionary, Fifth Edition, front matter and pg. 33.
Microsoft Computer Dictionary, Fifth Edition, front matter, back matter, and pp. 479, 486.
Neches, "Fast - A Research Project in Electronic Commerce," Electronic Markets - The International Journal, Oct. 1993, 4 pgs. vol. 3., No. 3.
Neisser, "Which is better for Social Media Monitoring: TweetDeck or SproutSocial" Mar. 17, 2011, Social Media Examiner, https://www.socialmediaexaminer.com/which-is-better-for-social-media-monitoring-tweetdeck-or-sproutsocial/.
Neo, "The implementation of an electronic market for pig trading in Singapore," Journal of Strategic Information Systems, Dec. 1992, pp. 278-288, vol. 1, No. 5.
Nicolle et a., "XML Integration and Toolkit for B2B Applications," by Christophe Nicolle, Kokou Yetongnon, and Jean-Claude Simon, Journal of Database Management, Oct. 2003-Dec. 2003 (Year: 2003).
O'Mahony, "An X.500-based Product Catalogue," Electronic Markets - The International Journal, Oct. 1993, 2 pgs. vol. 3, No. 3.
Palm, Inc., PalmTM Web Pro Handbook, copyright 2002-2003.
Post et al., "Application of Auctions as a Pricing Mechanism for the Interchange of Electric Power," IEEE Transactions of Power Systems, Aug. 1995, pp. 1580-1584, vol. 10, No. 3.
Preist et al., "Adaptive agents in a persistent shout double auction," International Conference on Information and Computation, Proceedings of the first international conference on information and computation economies, Oct. 25-28, 1998, Charleston, United States, pp. 11-18.
Qualcomm, "Brew Developer Support," printed from web.archive.org/web/20020209194207/http://www.qualcomm. com/brew/developer/support/kb/52.html on Aug. 30, 2007.
Rcr Wireless News, "Lockheed Martin to use 2Roam's technology for wireless platform," Rcr Wireless News, Sep. 10, 2001.
Reck, "Formally Specifying an Automated Trade Execution System," J. Systems Software, 1993, pp. 245-252, vol. 21.
Reck, "Trading-Process Characteristics of Electronic Auctions," Electronic Markets - The International Journal, Dec. 1997, pp. 17-23, vol. 7, No. 4.
Repcheck.com, www.repcheck.com homepage, printed from web.archive.org/web/20020330183132/http:// repcheck.com on Sep. 5, 2009.
Resnick et al., "Reputation Systems," Communications of the ACM, Dec. 2000, pp. 45-48, vol. 43, No. 12.
Rockoff et al., "Design of an Internet-based system for remote Dutch auctions," Internet Research: Electronic Networking Applications and Policy, 1995, pp. 10-16, vol. 5, No. 4.
Rodriguez, Camille, HootSuite vs. social Oomph vs. Tweekdeck, Jan. 4, 2012, http://polkadotimpressions. com/2012/01/04/hoot-suite-vs-social-oopmphvs.tweetdeck/ (Year: 2012).
Rose, "Vendors strive to undo Adobe lock-hold," Computer Reseller News, Feb. 5, 1996, n 66669, p. 71(7).
Ross, David Frederick, Frederick S. Weston, and W. Stephen. Introduction to supply chain management technologies. CRC Press, 2010.
Rysavy, "Mobile-commerce ASPs do the legwork," Network Computing, Jan. 22, 2001, pg. 71, 6 pgs., vol. 12, No. 2.
S. Kulkarni, A. M. Sankpal, R.R. Mudholkar and Kirankumari, "Recommendation engine: Matching individual/group profiles for better shopping experience, 2013 15th International Conference on Advanced Computing Technologies (ICACT), Rajampet, 2013, pp. 1-6. (Year: 2013).
Saunders, "AdFlight to Offer WAP Ads," Oct. 17, 2000, printed from clickz.com/487531/print.
Schaffer, Neil, The Top 20 Twitter clients - HootSuite, TweetDeck and More, Jan. 31, 2012, https:// maximizesocialbusinss.com/top-20-twitter-clients-2012-9175/ (Year: 2012).
Schmid, "Electronic Markets," Electronic Markets - The International Journal, Oct. 1993, 2 pgs. vol. 3, No. 3.
Schwankert, "Matsushita Taps 2Roam for Wireless Solutions," www.internetnews.com/bus-news.article. php/674811, Feb. 2, 2001.
Sen, "Inventory and Pricing Models for Perishable Products," Doctor of Philosophy Dissertation - University of Southern California, Aug. 2000.
Siegmann, "Nowhere to go but up," PC Week, Oct. 23, 1995, 3 pgs. vol. 12, No. 42.
T.Y. Lee, S. Li and R. Wei, "Needs-Centric Searching and Ranking Based on Customer Reviews," 2008 10th IEEE Conference on E-Commerce Technology and the Fifth IEEE Conference on Enterprise Computing, E-Commerce and E-Services, Washington, DC, 2008, pp. 128-135. (Year: 2008).
Telephony Staff, "Air-ASP," Telephony Online, Oct. 2, 2000, 3 pgs.
TEO, "Organizational Factors of Success in Using EDIS: A Survey of Tradenet Participants," Electronic Markets - The International Journal, Oct. 1993, 2 pgs. vol. 3, No. 3.
Tjostheim et al., "A case study of an on-line auction for the World Wide Web," printed from www.nr.no/gem/elcom/ puplikasjoner/enter98e.html on Jun. 10, 1990, 10 pgs.
Turban, "Auctions and Bidding on the Internet: An Assessment," Electronic Markets - The International Journal, Dec. 1997, 5 pgs. vol. 7, No. 4.
Ubid.com, "How do I track my shipment?" printed from web.archive.org/web/20010331032659/www.ubid.com/help/ topic27.asp on Aug. 30, 2007.
UBID.COM, "How do I Updated my Address, Phone, Credit Card, Password, etc.?" printed from web.archive.org/ web/20010208113903/www.ubid.com/help/topic13asp on Aug. 30, 2007.
V. Aksakalli, Optimizing direct response in Internet display advertising, Elsevier, vol. 11, Issue 3, May-Jun. 2012, pp. 229-240. (Year: 2012).
Van Heck et al., "Experiences with Electronic Auctions in the Dutch Flower Industry," Electronic Markets - The International Journal, Dec. 1997, 6 pgs. vol. 7, No. 4.
Verizon Wireless, "Verizon Wireless Customers Get It NowSM; Get Games, Get Pix, Get Ring Tones and Get Going in Full Color," press release to PRNEWSWIRE, Sep. 23, 2002.
Warbelow et al., "Aucnet: TV Auction Network System," Harvard Business School 9-190-001, Jul. 19, 1989, Rev. Apr. 12, 1996, pp. 1-15.
Weber, "How Financial Markets are Going On-line," Electronic Markets - The International Journal, Oct. 1993, 2 pgs. vol. 3, No. 3.
Wireless Internet, "DailyShopper Selects 2Roam to Enable Mobile Customers to Retrieve Nearby Sales and Promotions Information," Wireless Internet, Apr. 2001.
Wireless Week, "Verizon Wireless Gets Going on BREW Agenda," Wireless Week, Sep. 23, 2002.
Xchanger.net, webpage printed from www.auctiva.com/showcases/as_4sale.asp?uid=exchanger, undated but at least as early as Oct. 12, 2000.
Y.K. Choi and S. K. Kim, "An auxiliary reccomendation system for repetitively purchasing items in E-commerce," 2014 International Conference on Big Data and Smart Computing (BIGCOMP), Bangkok, 2014, pp. 96-98. (Year 2014).
Yu et al., "Distributed Reputation Management for Electronic Commerce," Computational Intelligence, 2002, pp. 535-549, vol. 18, No. 4.
Zetmeir, Auction Incentive Marketing, print of all pages of website found at home.earthlink.net/~bidpointz/ made Oct. 8, 2004.
Zimmermann, "Integration of Financial Services: The TeleCounter," Electronic Markets - The International Journal, Oct. 1993, 1 pg. vol. 3, No. 3.
Zwass, "Electronic Commerce: Structures and Issues," International Journal of Electronic Commerce, Fall 1996, pp. 3-23, vol. 1, No. 1.

(56) References Cited

OTHER PUBLICATIONS

"Onsale: Onsale Brings Thrill of Auctions and Bargain Hunting Online: Unique Internet retail services debuts with week-long charity auction for The Computer Museum in Boston," May 24, 1995, printed from www.dialogweb.com/cgi/ dwclient?dwcommand,D-webprint%20810-489267.

Di et al., "A New Implementation for Ontology Mapping Based enterprise Semantic Interoperation," by Xiaofeng Di and Yushun Fan, Applied Mechanics and Materials, vol. 16-19 (2009), pp. 644-648 (Year:2009).

* cited by examiner

SYSTEM AND METHOD FOR CREATING A CONSISTENT PERSONALIZED WEB EXPERIENCE ACROSS MULTIPLE PLATFORMS AND CHANNELS

CROSS-REFERENCE TO RELATED APPLICATIONS

This application claims the benefit of U.S. Provisional Application No. 62/906,378, filed Sep. 26, 2020, which is hereby incorporated by reference herein in its entirety, including but not limited to those portions that specifically appear hereinafter, the incorporation by reference being made with the following exception: In the event that any portion of the above-referenced provisional application is inconsistent with this application, this application supersedes said above-referenced provisional application.

BACKGROUND

This disclosure is particularly directed towards a platform for orchestrating and delivering a one-to-one personalized experience across all channels and platforms by which a user can access Internet content, acting as the connective tissue that creates a consistent experience across all points of a user's experience with a given party online.

Personalization of content to a user's preference is an area that is used for a number of purposes. Computer companies, such as FACEBOOK for example, collect data about users and use those data to customize a user's experience with the platform. In the past, that customization has been fairly limited: certain locations on a webpage can accept advertisements and other embedded images, and data are used to customize those locations on the webpage, or data can be used to target advertisements to a user.

This type of customization is fairly limited, though, and can create differences in a user's experience. For example, a user could receive emails about certain sales, but upon accessing the website those sales are not prominently displayed. Or, a user might receive a text message about a promotion that is not easily accessible on the webpage. What is needed is a method to personalize Internet content to make it more appealing to the user of the website based on the data collected, while maintaining a uniform experience across a variety of channels or platforms. This can be done by creating a system that draws from the same source for all communication with a user, therefore unifying the experience for the user across all platforms and channels of communication. In addition, in one embodiment, the system can be used to create a pageless experience, creating an individualized landing page for each user accessing the website.

The features and advantages of the disclosure will be set forth in the description that follows, and in part will be apparent from the description, or may be learned by the practice of the disclosure without undue experimentation. The features and advantages of the disclosure may be realized and obtained by means of the instruments and combinations particularly pointed out herein.

SUMMARY OF THE DISCLOSURE

A purpose of the instant disclosure is to create a system that collects information to orchestrate and deliver a personalized experience to a user accessing internet content across all different channels and on all different platforms, acting as connective tissue that creates a consistent experience across all points of a user's access to the content.

DETAILED DESCRIPTION

For the purposes of promoting an understanding of the principles in accordance with this disclosure, reference will now be made to illustrative embodiments of the invention. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

Before the devices, systems, processes and methods will be disclosed and described, it is to be understood that this disclosure is not limited to the particular configurations, process steps, and materials disclosed herein, as such configurations, process steps, and materials may vary somewhat. It is also to be understood that the terminology employed herein is used for the purpose of describing particular illustrative embodiments only and is not intended to be limiting since the scope of the disclosure will be limited only by the appended claims and equivalents thereof.

In describing and claiming the subject matter of the disclosure, the following terminology will be used in accordance with the definitions set out below.

It must be noted that, as used in this specification and the appended claims, the singular forms "a", "an", and "the" include plural referents unless the context clearly dictates otherwise.

As used herein, the terms "comprising," "including," "containing," "characterized by," "having" and grammatical equivalents thereof are inclusive or open-ended terms that do not exclude additional, unrecited elements or method steps.

The system and method disclosed herein solve the problem of creating a customized experience across all different platforms that a user might see, such as advertisements, emails on various subjects, a website, and other communications from a given company user to a number of individual users. Illustrative embodiments of the instant invention create a webservice that can be accessed through multiple channels and platforms, each platform drawing from the same elements customized to a given user. This webservice is used to generate information for all different platforms that the user communicates with, creating a customized experience and customized content that is consistent across all channels through which a user might have contact with a given company. These channels could include text messages, emails, advertisements, and websites, for example.

Figure 1:
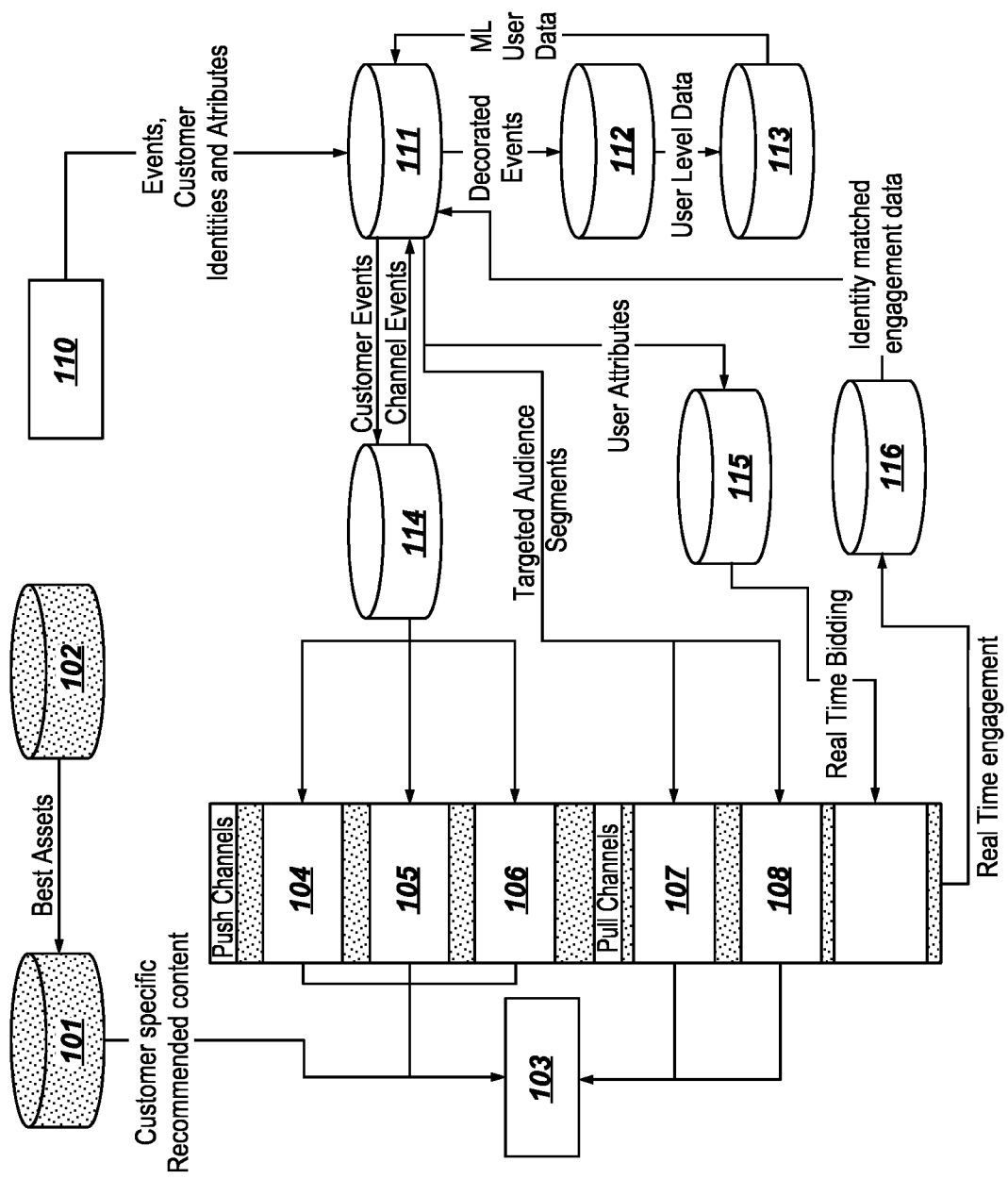
FIG. 1 shows an embodiment of a system and method for creating a consistent personalized web experience across multiple platforms and channels showing the system communicating with a variety of channels in an e-commerce context.

In one embodiment of a system, method, and product for creating and delivering a personalized one-to-one experience for a user receiving communication from a given company shown in FIG. 1, a system comprises a personalization structure 101 and an Asset Data Platform 102, which are stored on a non-transitory computer readable medium. The instructions stored on the non-transitory computer readable medium comprise instructions that cause the system to take certain actions and access certain elements whenever the system must communicate with the user. The asset data platform 102 contains a variety of assets that can be used to generate personalized pages. Assets may be gathered from a variety of sources, and may be identifiers, attributes, or events. Attributes include colors, styles, locations, or other information linked to a particular user, along with a confidence factor for each attribute. Events include a full history of each item including when, where, from whom, to whom, where on the page it was shared, and other information. The asset data platform 102 may have access to external sources in creating, identifying, and classifying assets.

In an illustrative embodiment of the system, the personalization structure creates customer specific recommended content that is used to create a personalized landing page at the user level 103. A customized landing page is created when requested through a variety of channels. These may be push channels, such as email 104, web notifications 105, or a push through an application 106; or they may be pull channels, such as a web search 107 (as through a search engine such as Google) or a social media request 108 (as through FACEBOOK). While these channels may be accessed in different ways, the system utilizes the same data to create a personalized experience that is unified throughout a variety of different systems and channels to communicate with the system or the company user which utilizes the system.

In an illustrative embodiment of the system, the company user 110 provides events, customer identities, and customer attributes, as well as other necessary information to a Customer Data Platform (CDP) 111, such as mParticle or another similar CDP. The CDP may provide certain events to a data storage and analysis program 112, such as the commercially available Snowflake. This system in turn provides user level data to a machine-learning processing platform 113, such as Databricks. The machine learning data generated by the machine-learning platform is returned to the CDP 111 to give more data about a user and provide a better system for communicating with that user. When operating through push channels, the CDP 111 may provide data, including customer events, to a customer engagement structure 114, such as braze. This structure provides information to and requests the push channels, email, and web notifications.

The CDP 111 may also provide targeted audience information to search engines 107 or social media 108. This information, like that provided to Push channels, is used to generate personalized user-level landing pages. The CDP 111 may also provide information to an advertising and bidding program 115 such as Beeswax, which provides realtime bidding to obtain slots for paid advertising which can be accessed by the user. In addition, the paid advertising may provide real-time engagement data to a linking platform 116. In an illustrative embodiment, Branch is the linking platform and provides identity matched engagement data back to the CDP, which can then be used in the machine learning system to generate a more sophisticated and accurate model for providing information.

In an illustrative embodiment of the invention, the system and method create individualized, personalized communication across multiple channels. In an illustrative embodiment, this system and method comprises a non-transitory computer readable medium that may comprise a company server, a user computer, and a network connection. The company server may be accessible to the user computer through a network connection. It will be appreciated that the company server may comprise multiple servers linked together as in a server farm, and that the user computer may be an access device, which includes a smart phone, a computer, or a server or multiple servers through which a user may communicate with the company user via a network connection, such as the Internet.

Figure 2:
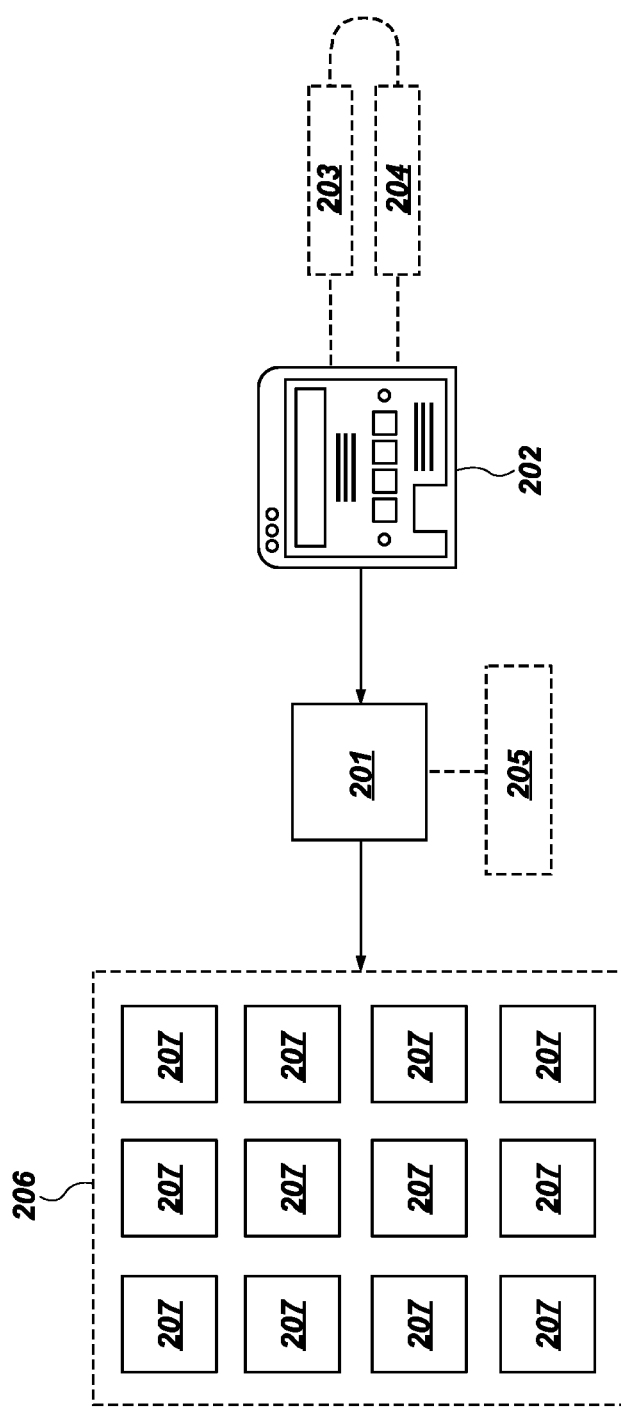
FIG. 2 is a block diagram showing an embodiment of the system showing the access to multiple element webservices to provide a content deliverable to any channel/platform showing a tied experience between onsite content and off-site content.

FIG. 2 shows an illustrative embodiment of a system that creates a consistent, personalized web experience across multiple platforms and channels. The invention may include a personalization structure 201, which may be a program stored on a non-transitory computer medium. The personalization structure 201 is designed to create a personalized, one-to-one experience for any user communicating with a company user. The structure 201 receives a request from a channel or platform 202, which is accessing either onsite content 203 (such as the website of the company user, or a search of content on the website), or offsite content 204 (such as an email, a text message, or even a banner ad on another website). The request from the channel or platform 202 communicating with the personalization structure 201 may include a variety of different requests and formats, such as a search by an individual user, an email communication, a phone communication or text, instant messaging, a request to access a website, a request for product landing page, or even a request from the company user's own website to generate an email communication. These examples are given only by way of example and are not meant to limit the type of communication that may be accomplished. The personalization structure 201 may be programmed to communicate with any type of communication through which a computer may receive communication.

Upon receiving a request from a channel or platform 202 to provide information, the personalization structure 201 makes a request to draw the required elements 206 to generate content deliverable to the channel or platform 202. The elements required are generated by element webservices 207, each of which has the logic required to fulfill the request to provide a personalized content deliverable. This may require the element webservice 207 to access outside webservices to provide customer propensities, product services, desired images, and other requirements to provide a fully personalized content deliverable. Each element webservice may have appropriate logic and machine-learning systems required for it to provide personalized content to a given user.

Upon receiving the elements required to create a content deliverable, the personalization structure 201 utilizes element ordering logic and machine learning 205 to create and deliver personalized content in real-time for offsite and onsite channels and platforms. Whichever type of deliverable is required draws on the same element webservices to generate the content for the required deliverable. This creates a unified user experience whether the user is accessing onsite content 203 from the company user's website, or offsite content 204 that is requested by or directed to an individual user from the company user. The personalization structure uses the provided logic and machine learning 205 to create personalized content from a variety of elements 106 that the structure has access to in order to create a personalized experience that remains uniform across different channels of communication and across different platforms for communication.

Figure 3:
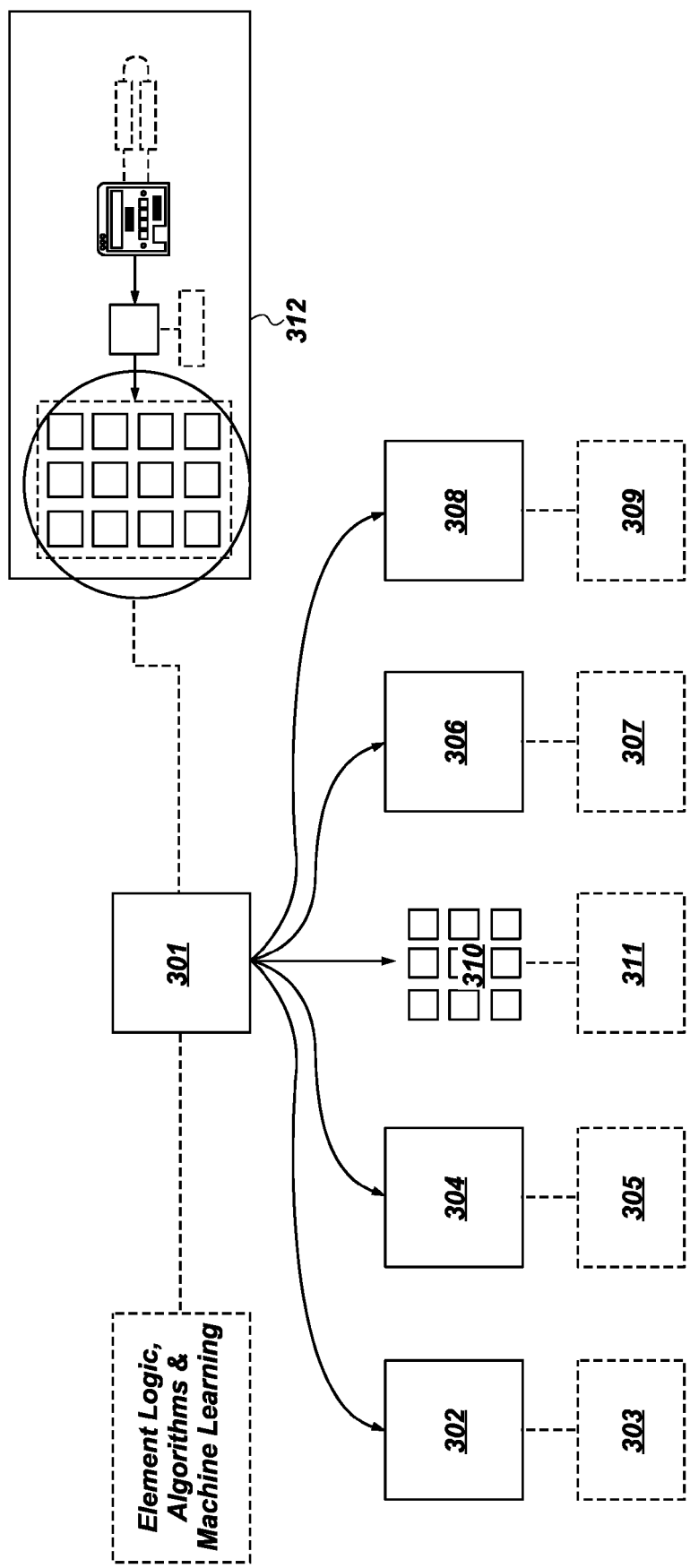
FIG. 3 shows the construction of the element webservices.

The element webservices that generate the required elements for a content deliverable are stored in a non-transitory computer readable medium. This medium is accessible to the personalization structure, and contains in memory a cache of Element Webservices, shown in FIG. 3. Each Element Webservice 301 comprises data and logic needed to build personalized content for a given element in real-time, which may include accessing information from other locations. In an illustrative embodiment, each element webservice also has access to machine learning systems and logic that allow it to improve its creation of content deliverables over time. For example, in one embodiment, an Element Webservice will pull data from the asset data platform 302 to bring in an image or other deliverable 303. The asset data platform (ADP) may be generated as a table of assets with access to outside programs to aid in classifying and identifying various assets.

An Element Webservice could also pull data from customer propensities 304 based on actual or predicted behavior of the user on other websites 305, or past behavior of the user on that specific website 305. This may include, for example the user's shopping habits, or other data that may be available either through a commercial source online, or through the data stored by the company user. The Element Webservice 301 can also access information about the source of the user's inquiry 307: in the case of an e-commerce type use, this could be data about a particular product, which is collected through a system provided by the company user to collect those data 306. Another illustrative example of an Element Webservice would collect information about a particular user 309. This information may be imported into the given Element Webservice 301 through a program 308 created to collect and distribute data about particular customers. This program 308 may be created by the company user, or it may be through a commercially available program, and could include information such as age, interests, or other biographical data. In an illustrative embodiment, the element webservice may be designed to gather information from a commercially available customer data platform (CDP), such as mParticle, or a similar data collection program.

An Element Webservice 301 can also access other additional data 311 determined to be necessary to create a content deliverable. This information may be collected from a variety of databases, accessed through the appropriate application programming interface (API), or from information collected in the databases of the company user 310. None of the given examples are meant to limit the Element Webservice to a particular type of data, or to a given program, as the Element Webservice can be made to access whatever type of data is needed and available to personalize the experience for a given user. An individual element webservice has access to the data needed to create an element for a content deliverable, where the content deliverable is the vehicle by which the company user is communicating with the individual user. For example, and not by limitation, a content deliverable may be sent to a user via email, and may be the particular communication in an email directed at the user. Alternatively, a content deliverable could comprise only a portion of an email that must be inserted to personalize the email to an individual user, such as a pregenerated paragraph encouraging the user to examine items abandoned by the user in a previous visit to the website.

Each element webservice 301 is a self-contained structure that also includes all of the logic structures required to allow the element webservice to access all relevant data to create a content deliverable. The element webservice is accessible to the personalization structure as shown in FIG. 2, ref. no. 312. Each element webservice can be accessed to generate an element in response to requests from a user to access content available from the company user. In an illustrative embodiment of the current invention, the personalization structure can also be used to create a "pageless experience," wherein a user accesses the Internet content through an individualized landing page created in real time and customized to the user rather than through a uniform webpage. This pageless experience combines multiple elements by using the organization logic and machine learning 205 to generate the optimum organization for the user for a given content deliverable, which may be an individualized landing page, a personalized email, or another personalized content deliverable.

Figure 4:
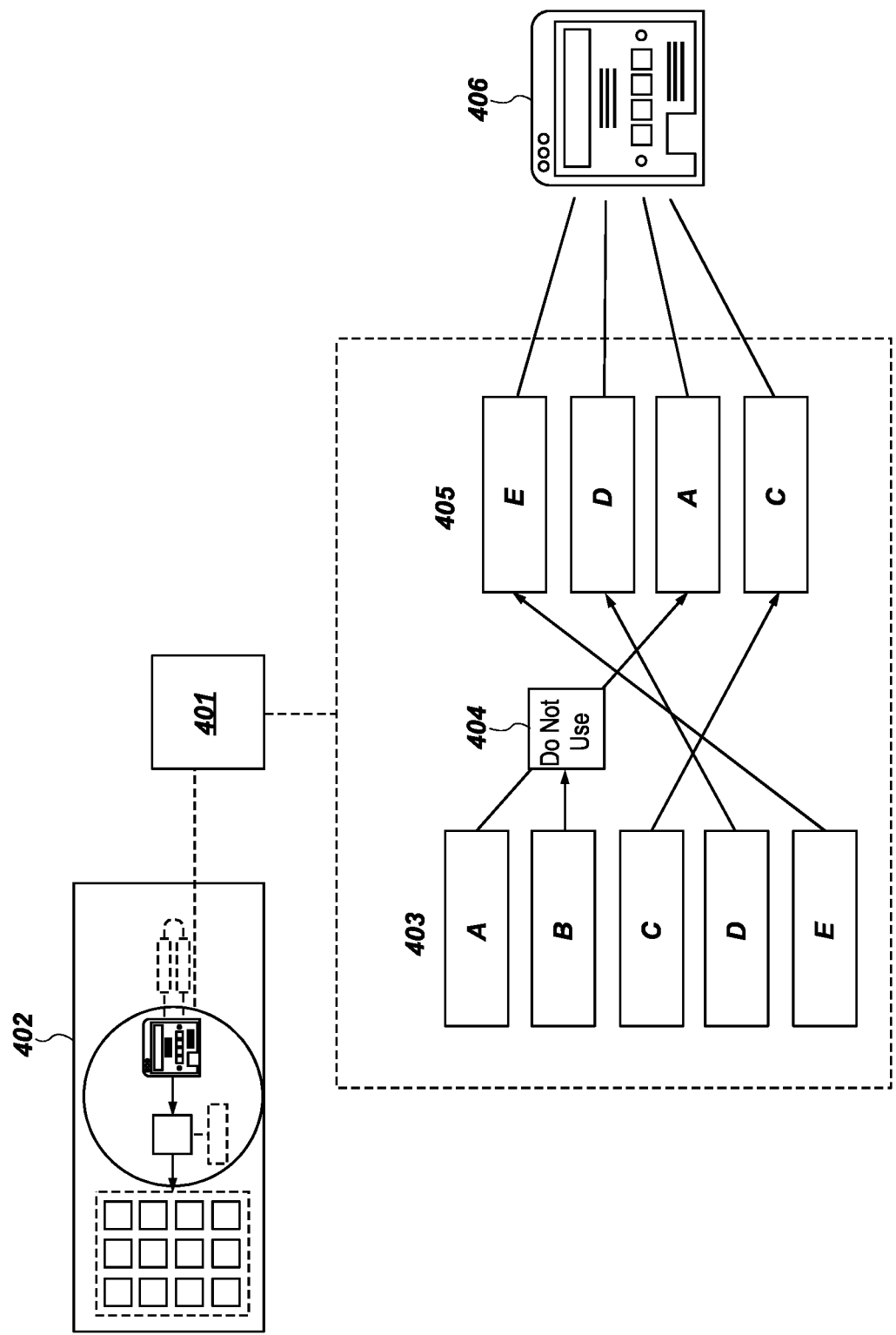
FIG. 4 is a diagram demonstrating the ordering of elements to produce a pageless content deliverable and showing individual use elements and possible pageless experiences.

FIG. 4 shows an example of a system and method that will order different elements when a platform requests an experience that utilizes multiple elements, such as a pageless experience. The personalization structure 401 creates a pageless experience by determining the best order of content elements to deliver for a given context, platform, and customer. The ordering utilizes element ordering logic until machine learning has enough information to act, and then machine learning aids in ordering elements properly. This process takes place to deliver a content deliverable to a proper channel or platform when that content deliverable requires multiple elements 402. The eligible elements in this process 403 are collected and the logic to order these elements is defined based on the best information available for a given user. In some cases this logic may lead to an element being excluded from the final deliverable 404. The personalization structure 401 arranges the eligible elements into ordered elements 405, which are communicated to the requesting platform 406 along with the order and organization in which the elements are to be displayed. The ordering logic is enhanced by machine learning programs such that the order and presentation of the elements is done in the optimal manner for a given situation (considering the platform, the customer, and the context).

A pageless experience, which combines two or more elements, may be requested in a variety of situations. For example, a customized PLA landing page may be generated as a pageless experience. A product listing ad is an advertisement that includes a product image along with a clickable link to direct a user to a landing page for a specific product. Using the personalization structure, a PLA landing page may be generated as a pageless experience customized to an individual user. A pageless experience may also be used to generate an abandonment email or a Pinterest landing page, which is customized to an individual user.

In another illustrative embodiment, the personalization structure may access only a single element to insert that element into a particular place in response to a request from the channel or platform. A variety of Element Webservices are available to personalize the particular communication. One type of Element Webservice may create an individual use element related to a product of the company user. For example, an element may be created that is related to cross sell products or products similar to a product a user has accessed. An element might be created that shows a product featured by the company user, or "Buyer's Pick" products or "Top Products," which feature products that are distinguished in other ways. An element might be created to show certain products displayed in the media or that are popular on a social media site. Other elements might be created for specifically when a user accesses content in a certain way. Other elements might be tailored to a user's particular affiliations, such as an element that gives information on a shopping club or rewards program, or that creates an element based on the history of the user, such as an abandoned cart element. Still other elements might include information for an email or particular events that the company user wishes to promote.

Figure 5:
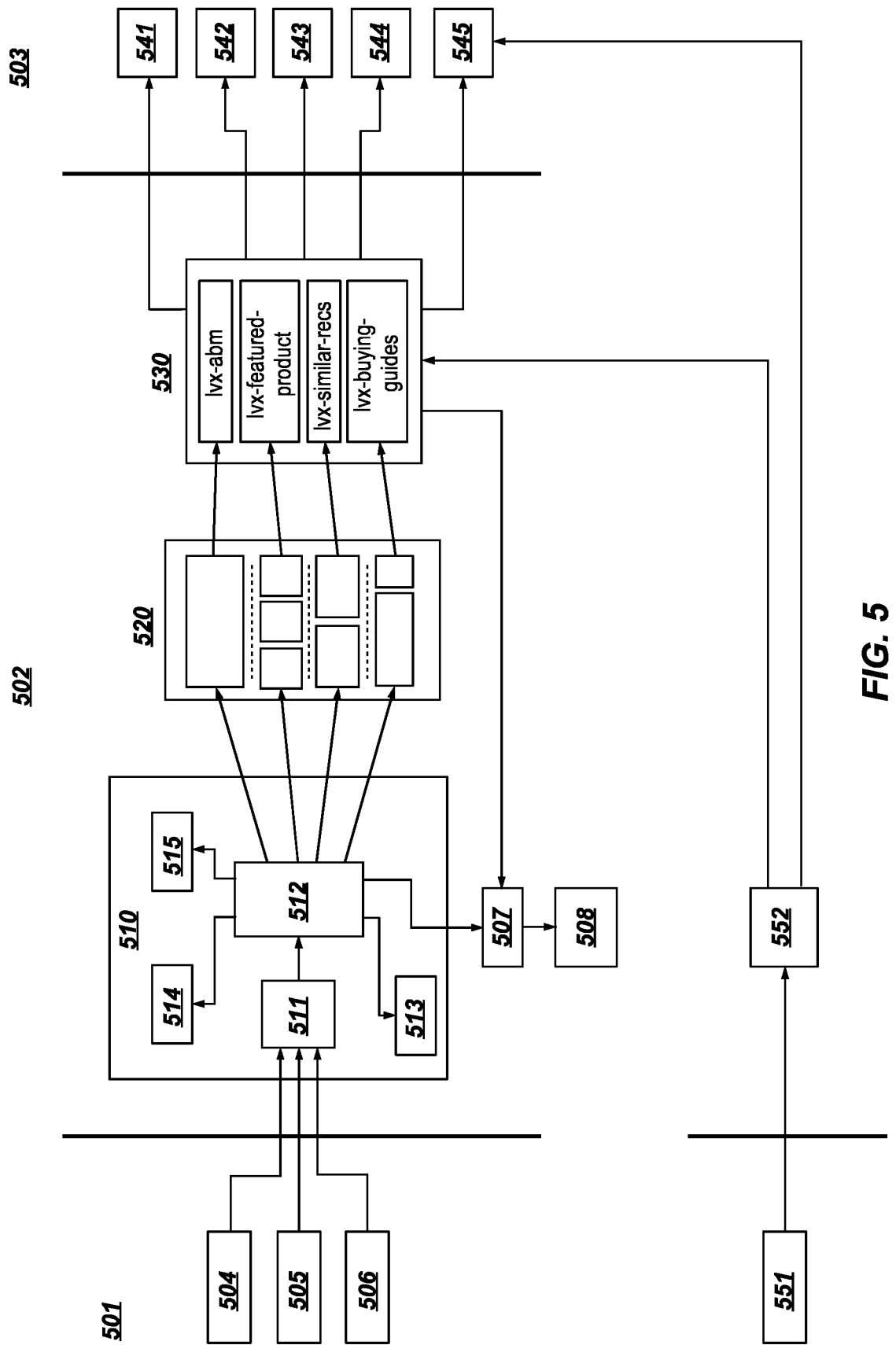
FIG. 5 is a block diagram showing the layout structure of the system.

FIG. 5 shows an illustrative embodiment of a process of delivering content from a request for content to the creation of content itself. This process takes place in real time in a situation where the personalization is used. In the first step 501, a request for a content deliverable is made of the system. This request is received and a content deliverable is generated in step 2, ref. no. 502. Finally, in step 3, the content is put into an appropriate format and delivered to its destination 503.

In step 1, ref. no. 501, a request for a content deliverable is made. This request may be a request for a pageless experience, such as a landing page 504 or an email 505, or it may be request for a single element to fit into an already-generated template 506.

In step 2, ref. no. 502, the request for a content deliverable is received by the layout endpoint 511 in the layout structure 510. The layout endpoint 511 provides information to the layout decision structure 512. The layout decision structure 512 draws information from a variety of sources to generate the best layout for a given customer. In the case of a single element request, the structure may be pregenerated for the most effective layout to present a single element. The layout decision structure may draw information from configuration programs or machine learning systems 513 to generate a properly formed layout 520, viewport detection programs 514 to ensure that the created layout fits the size of the user's screen, and fallback elements 515. The combination of these elements is used to create an optimal layout for the content deliverable for a particular user. In addition, the layout decision structure 512 may draw and provide information from a customer attribute service 507, which draws information from and provides data to external data sources 508 such as commercial customer information services, an example being mParticle. The customer attribute service can also draw information from the element web services 530, and gather that information to provide to the layout decision structure 512. The layout decision structure 512 uses this information to generate a template/page layout 520.

After a template/page layout 520 is generated, the Element web-services 530 are called to provide content for the generated page. This generated page may be an email, a landing page, or any other customized communication between the company user and an individual user. The element webservices may include similar ideas to a current purchase, a featured product, a link to buying guides, an advertisement or standard product, or any other content that would be optimal to have in a given communication with a given user. Each piece of content is generated by a particular element webservice and is located in the template/page layout in a particular location, which is determined by the layout decision structure to be optimal for the given user. Once the element web services 530 have filled in the template, the content deliverable is delivered to the platform that requested it in step 3, ref. no. 503. The content may be provided to a variety of Application Programming Interfaces (APIs) to create a deliverable that is appropriate for the communication channel and platform. These interfaces may include a communication database 541, such as Oracle database, or to a system that allows voice communication 542, such as OREC engine. The information may be provided to a passive data structure 543, or to other APIs 544, for communication to an appropriate channel. The deliverable may also be provided to an asset data platform 545, which may store the information for later use within the system. Each element webservice 530 is a self-contained structure that also includes all of the logic structures required to allow the element webservice to access all relevant data to create a content deliverable, which can be delivered to whichever channel or method of communication which it must go through.

In addition, the system may receive content to be generated into an email 551. The content is sent through an email image structure 552 that has access both to the element webservices 530 and the asset data platform 545 to obtain specific data on the recipient of the email and generate an email personalized to a particular recipient.

Figure 6:
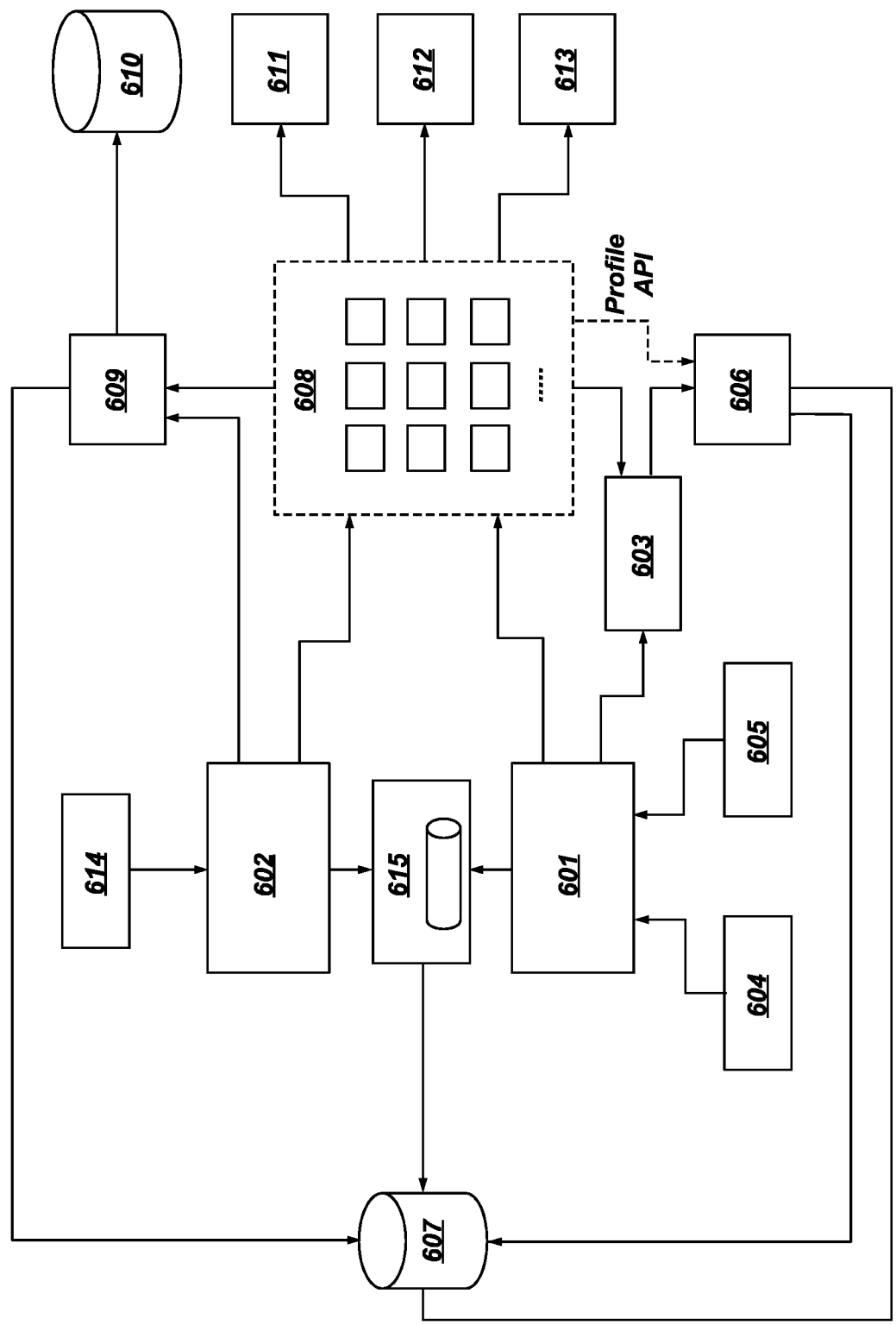
FIG. 6 is a block diagram showing the content delivery structure of the system.

FIG. 6 shows an arrangement of a delivery structure that may be used in an embodiment of a system for creating a consistent experience across multiple platforms and channels. The system may include a layout structure 601, an image structure 602, and a customer attribute service 603. A content request is received by the layout structure 601. This content request may be a request for a pageless experience 604, or a request for an individual element 605. The layout structure 601 creates a template and provides information to the customer attribute service 603, which may provide customer information to an external customer database platform such as mParticle 606 to request information about the customer. These data may further be provided to a data storage and analysis program 607 such as Snowflake, which may also provide additional information to create a content deliverable. This information can be provided back to the customer attribute service and used to determine which elements should be used. The layout structure 601 also provides information to the element web services 608, which provide information to the asset data platform 609. The Asset Data Platform 609 uses the information provided by the layout 601 through the element webservices 608 to create content appropriate to the user interface used to make the request 610. The element web services also provide information to product data API's 611, another communication engine, such as the OREC engine 612, or other databases or APIs 613, which can assist in creating the personalized content by placing the content into an appropriate format for communicating with an individual user.

In addition, the image structure 602 may receive a request for real-time email content 614, which is provided to the asset data platform 609 and the element web services 608 to provide an appropriate response for the user interface, in this case a real-time email request. This may be to provide information for an email that is left ungenerated until it is opened, at which point the most timely, customer appropriate information is used to fill in the email. Both the image structure 602 and the layout structure 601 may produce data that can be monitored in real time through a data tracking program such as Kinesis 615. This program tracks the exhaust data from the system and provides it to the data storage and analysis program 607 to better create customized content.

Figure 7:
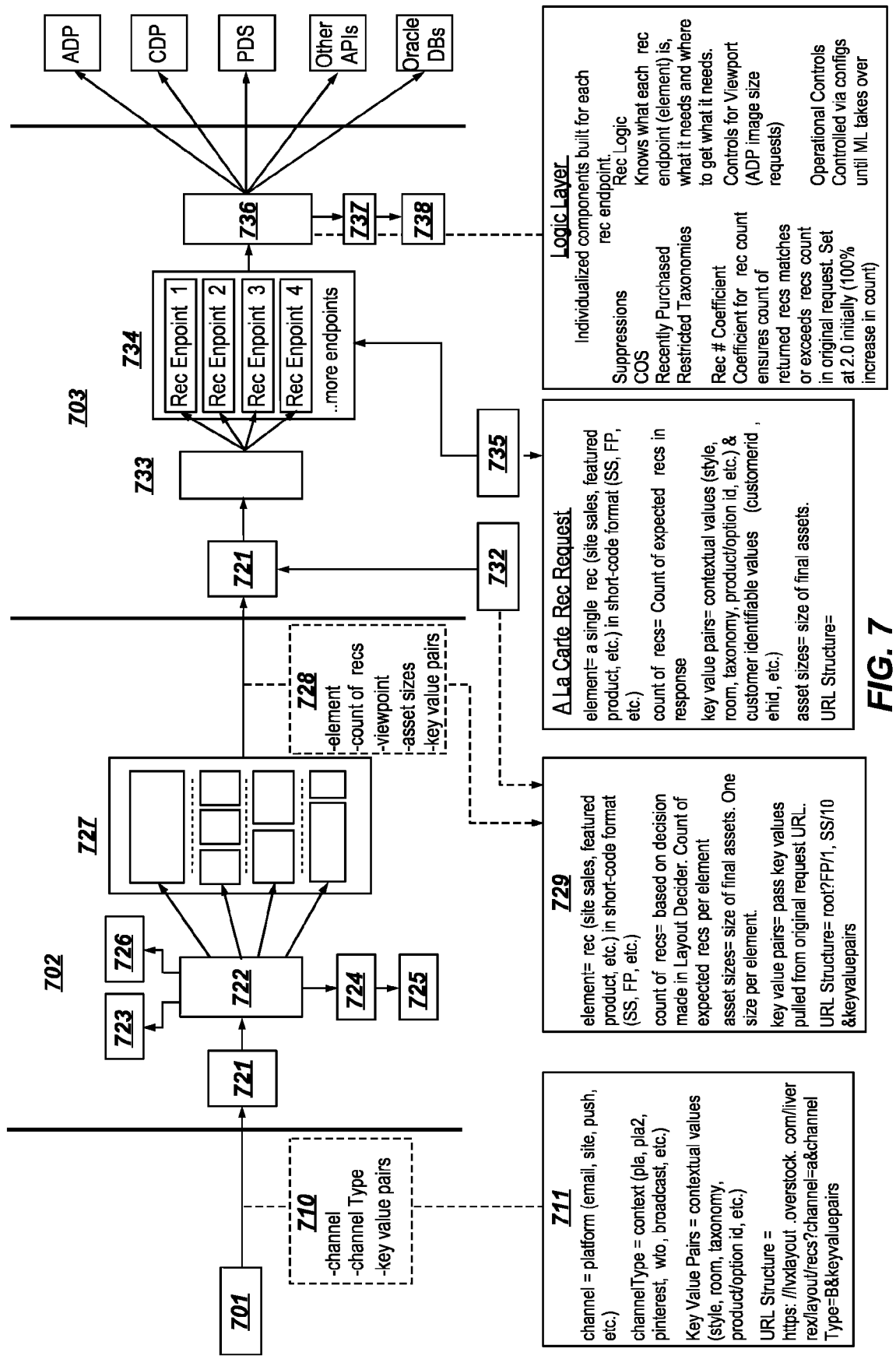
FIG. 7 is a block diagram showing the layout and functioning of an embodiment of the system.

FIG. 7 shows an illustrative embodiment of a personalization structure and a method of using it that forms a part of a system and method for creating a consistent, personalized web experience across multiple channels and platforms, as it might be used in an e-commerce setting. First, the server receives a request for a landing page 701. The request is sent to the layout structure 702 and to request a URL 710. Upon requesting a URL the landing page contextual request is generated 711. This request may be based upon multiple factors. The first is the channel, which is based on the platform being used, such as email, a website, a push advertising request, or another method of communicating with a user. The second is the channel Type, which is based on the context of the request, is the request for a product landing page, a Pinterest site, a wto, a broadcast site, or another type of communication. Another contextual item is the Key Value pairs. This is based on the contextual values for the structure, such as the style, the product options, the room, the taxonomy; and variables that are identifiable to the individual user, such as a customer id, ehid, and other customer variables. A URL structure can be generated, using the variables to create a unique URL for a particular landing page that the user accesses.

To generate the landing page itself, the request for a landing page also is provided to the layout structure 702. This structure comprises an endpoint 721, which receives the request and provides it to the layout decider 722. The layout decider accesses a viewport detection service 723, which determines the appropriate elements to display the layout on a given screen. The layout decider 722 also has access to a configuration service 724. The configuration is run by logic through the database containing information on a user's propensities (or propensities of users in general). The database also has a machine learning system and a testing system that take over from the configuration service 724 when there is enough data and training in the machine learning system to do so. The layout decider 722 also has access to fallback elements 726 to use as well. Once the layout of the landing page 727 is generated it may make a URL request 728. The URL request for multiple recs is based on a variety of factors 729. This includes the element used, such as site sales, a featured products, etc. It can also be based on factors such as the asset size and key value pairs. The asset size variable depends on the size of the final assets, which provides one size per element. The key value pairs pass key values pulled from the original request URL. This generates a URL structure of the format =root?FP/1,SS/10&keyvaluepairs.

Once the site is generated it goes through a similar structure 703, starting at a new endpoint 731. From the endpoint another multiple rec request may be made for a URL 732, and the generated page will go through a deduplicating process 733 to eliminate duplicate product Ids across all final recs. The deduplicating process can also deduplicate the page based on other factors as well. After going through the deduplicating process 733, the layout pate may generate a number of rec endpoints 734 as elements. At this point, an a la carte rec request 735 may be made for a URL related to a single rec endpoint. The a la carte request depends on factors such as which element is being accessed (site sales, featured product, etc.), a count of the recs expected in the response, key value pairs, which is contextual values and customer identifiable variables, and the asset sizes, which is the size of the final assets.

The Rec endpoints 734 are provided to the logic layer 736. The logic layer is provided with a series of configurations 737, which control the logic layer until the machine learning system 738 has enough data to control the logic layer. The logic layer consists of individualized components for each rec endpoint. These components can include suppressions, a rec # coefficient, rec logic, and operational controls. The Suppressions may suppress OOS from a given user's landing page. It may also suppress recently purchased items from the user's landing page or restricted taxonomies from the user's landing page. The Rec# Coefficient may ensure that the count of returned recs matches or exceeds the original recs count in the original request. In an illustrative embodiment this may be initially set at 2.0, which leads to a 100% increase in the rec count. The Rec logic is provided to know what each rec endpoint (or element), the requirements for each rec endpoint, and where to access the data for each rec endpoint. This system may also include controls for the viewport to make image size requests of the ADP. Finally, the operational controls may be controlled via configurations programs until the machine learning system has enough data to take over.

Once the layout goes through the logic layer it is a layout provided with the proper elements to fill it in and create a personalized landing page based on the same elements that will be used to create an email or an advertisement to the same user, creating a unified, personalized experience for the user. The finished page may be provided to the asset data platform, a CDP, a passive data structure, other APIs, or a database system, such as Oracle Database.

In an illustrative embodiment of the service, each element's content shares the same origin, the Element Webservices, which ties together offsite and onsite personalization. In an illustrative embodiment, the service can deliver content for a variety of channels. For example, when an email is sent out, the webservice can generate an image when the email is opened. To do this, the service draws from the elements, which may be personalized based on information on each person accessing the email. When that same user is on a website and the website calls for an ad from the company user, the elements that are drawn from to create the advertisement for the website are the same elements that were used to create the email. Since the elements are accessible across a variety of channels, including the email, the website, advertisement pages, etc., the experience the user gets from the totality of communications with the company user is one that is targeted precisely to each individual user.

In an illustrative embodiment, the elements can also be combined in an order specifically targeted at a given user to create a "pageless" experience, which creates an individualized landing page and individualized display for each user. This individualization uses the user's preferences, shopping history, and any other elements of information about the user to create the content. The individualized landing page draws from the same cache of elements stored on the server that creates emails, targeted advertisements, and other communications from the company user to an individual user.

In another illustrative embodiment, the elements can be combined in an order specifically targeted at a given user on any channel or platform through which the individual user communicates with the company user. For example, just as an individualized landing page and display can be created for each user, using the user's preferences, shopping history, and any other information about the user to create the content of the landing page, so too can the same information be used to create an email, ordering the elements of the email dynamically for each individual user. This individualization uses the user's preferences, shopping history, and any other elements of information about the user to create the content, which can be anything to communicate information, from the website landing page, to an email, to a text message. The content draws from the same cache of elements stored on the server that creates emails, targeted advertisements, and other communications from the company user to an individual user. Any channel or platform that can accept multiple types of content for one experience can be individualized for a specific user, combining the user's information from the same cache of elements used to create the landing page. This helps create consistency across all channels and platforms used by each particular user.

In an illustrative embodiment, the different elements can be accessed from a variety of channels and platforms. When a given channel or platform must communicate with user, for example through an email or a text message, or on a given website, the channel sends a request to the system. The system then accesses the cached elements. The channel can make a request for a single element, for example, an "item-in-cart" element, for an email following up on an unpurchased item in the user's cart. The element contains all the logic and data needed to create a deliverable to the given channel. In another illustrative embodiment, for example when the email is more general or when the user accesses the website, the channel can request information from multiple elements, such as user propensities, past purchases, past viewed websites, and other elements and from the logic in the system create a content deliverable that gives a customized page for the user to access, whether by accessing an actual webpage or through content embedded in an email.

In an illustrative embodiment, the system can also include a machine-learning algorithm as known in the art, which incorporates a user's responses to the displayed content to determine the contents of elements for an individual user. As such, each element can become personalized for an individual user and can contain the content best needed to appeal to the user. In addition, one illustrative embodiment allows the system to use machine learning to determine which elements should be included in a pageless experience for an individual user.

One illustrative embodiment of a system for supporting and creating consistent personalized content to a user of a webservice across multiple channels and platforms of communication with the user comprises: a server capable of responding to requests from multiple platforms and channels; a cache of multiple Element Webservices stored in memory of a server, each Element Webservice having access to all data and logic necessary to build a personalized content deliverable in real-time, the personalized content deliverable being an element; a non-transitory computer readable medium containing in memory instructions, wherein the instructions causing the system to execute the following steps upon receiving a request for a content deliverable:
  Determine they type of request, whether for a single Element Webservice or for a pageless deliverable;
  Access the requested element webservices;
  If the request is for a single element webservice, deliver the data in the element webservice to the platform making the request;
  If the request is for a pageless content deliverable, create a layout for the content deliverable, determine the optimal order of elements and which elements are best to contain in the deliverable, then order the elements in the proper order and deliver the pageless content deliverable to the server making the request.

Another embodiment of the system also incorporates a machine learning algorithm to incorporate past data into the future use of the specific order of elements webservices and appropriate elements to access, as well as incorporating machine learning training, such as using training sets and possible future reactions, as well as other types of machine learning training known in the art.

Another embodiment of the system also comprises an Asset Data Platform, which comprises various assets that can be drawn on by element webservices to create a given element. The asset data platform may comprise data including images, colors, fonts, sounds, colors, specific shapes or interfaces, or other types of assets which are required to create a content deliverable.

Another illustrative embodiment of the system grants Element Webservices access to a database giving information on a user's propensities based on past behavior and predicted future behavior and creates an element based on those user propensities. This database may be a database compiled by the company user providing the content deliverables, or it may be a commercially available database wherein the company user pays a fee for access to information about users and data.

Another illustrative embodiment of the system allows an Element Webservice to access data on a particular product and creates an element showing information about the particular product.

In yet another illustrative embodiment of the system, an Element Webservice has access to a Customer Data Platform that provides identification of a user and attributes of that user and creates an element based on the information from the Customer Data Platform.

Another illustrative embodiment of the system comprises an Element Webservice, which has access to any API which provides information needed to create a particular element to create a content deliverable. This may include information on a customer, product, or particular channel, as well as geographic information, or other information which can help customize a particular element to a given user.

Another illustrative embodiment of the invention comprises a system for creating consistent personalized content to a user of a webservice across multiple channels and platforms of communication with the user. This system may include a cache of element webservices stored in a computer readable non transitory medium linked to a network to provide accessibility to the other elements of the system, wherein each Element Webservice comprises data and logic needed to build personalized content for a given element in real-time. The system also includes a layout structure, wherein the layout structure receives requests for content and generates an appropriate layout for content built by the Element Webservice to fill and provides the layout to the element webservices. Another part of the system is an image structure, which receives requests for real time email content and generates image requests to be sent to the element webservices. The system also includes a customer attribute service containing information collected by the webservice on individual users.

Upon receiving a request for an individual element, the system takes the following steps: Receive the request for an individual element at the layout structure; Create a template at the layout structure and provide the template to the customer attribute service and the element webservices; Cause the element webservices to generate the requested element and insert the element into the template created; and Provide the filled template to an appropriate API to fulfill the request.

Upon receiving a request for a multiple element experience, such as a customized landing page or another pageless experience the system takes the following steps: Receive the request for an individual element at the layout structure; Create a template at the layout structure by accessing information specific to a user and generating a template customized to the user making the request for a multiple element experience; Provide the template to the customer attribute service and the element webservices; cause the Element Webservices to generate the requested elements and insert the elements into the template created; provide the filled template to an appropriate API to be fulfill the request.

Upon receiving a request for real-time email content, the system takes the following steps: receive the request for real-time email content at the image structure; provide an image and data on the request to the asset data platform and the element webservices; cause the element web service to generate the requested element for an email and provide the requested element and email images to the asset data platform; provide the requested real-time email content, including the image and generated element to the user interface in real-time as the user opens an email.

In another illustrative embodiment of the invention, the layout structure further comprises: A layout endpoint that receives a request for a content deliverable; a layout decision structure that receives the request for a content deliverable from the layout endpoint, collects information, and accesses logic structures to create a layout for a content deliverable; a configuration program containing instructions on how to generate an appropriate layout for a given content deliverable; a viewport detection structure that detects the size of a viewscreen upon which the request will be viewed and ensures that the layout is the appropriate size.

In another illustrative embodiment of the invention, the configuration program further comprises a machine learning structure that is used to generate an appropriate layout for a given content deliverable.

Another illustrative embodiment of the system includes a layout structure that further has access to external data sources, such as a customer information service or a customer database platform; and wherein the layout structure accesses the external data source to contribute to the creation of a layout that is tailored to the user making the request for a content deliverable.

In yet a further illustrative embodiment of the system, each element webservice has access to machine learning programs and external services such as a customer data platform (CDP), which allow it to create personalized content deliverables for the template from the layout structure.

Another illustrative embodiment of the invention is expressed as a method for creating consistent personalized content to a user of a webservice across multiple channels and platforms of communication with the user, wherein the method comprises: providing a cache of element webservices, wherein each element webservice comprises data and logic needed to build personalized content for a given element in real-time; receiving a request for a content deliverable; creating an appropriate layout for the content deliverable, wherein the layout contains space for information for each requested element; generating the requested content from the element webservices, wherein each element webservice uses the data and logic it contains to build personalized content for a given element in real time; inserting the requested content from the element webservices into the layout, creating a finished content deliverable; and providing the content deliverable to the requesting user.

Another illustrative embodiment of this method also comprises the step of determining an optimal order of elements and which elements are best to contain in the deliverable, then further ordering the elements in the proper order and delivering the content.

Another illustrative embodiment of the method also comprises the step of accessing a machine-learning program while creating the layout, allowing for the system to create content layouts and utilize both past and training layouts to create an appropriate layout for a given user.

In yet another illustrative embodiment of the method, each element webservice also has access to machine learning systems, allowing each element webservice to create personalized content using information on the past creation of personalized content and projected user responses to created content for a particular element which factors into the creation of a content deliverable.

What is claimed is:

1. A system for supporting and creating consistent personalized content to a user of a webservice across multiple channels and platforms of communication with the user, said system comprising:

a server capable of responding to requests from multiple platforms and channels;

a cache of multiple element webservices stored in memory of a server, each element webservice having access to all data and logic necessary to build a personalized content deliverable in real-time, said personalized content deliverable being an element;

wherein each element webservice is capable of generating content usable by multiple types of content deliverable customized to multiple offsite and onsite channels and platforms;

a non-transitory computer readable medium containing in memory instructions, said instructions causing the system to execute the following upon receiving a request for a content deliverable;

determine the type of request, whether for a single element webservice or for a pageless deliverable;

generate a template in which to deliver the content deliverable, which is appropriate for the type of content deliverable requested, wherein the appropriate template generated for a single element webservice is a structure pregenerated to provide the most effective layout to present the single element;

wherein the system generates an appropriate template for a pageless content deliverable for each individual user by using a combination of one or more of the following elements: the type of deliverable requested; configuration programs, machine learning systems providing information on generating a properly formed layout for a template, viewport detection programs ensuring that the created template fits the size of the user's screen, and an external customer attribute service drawing information from external data sources and the element web services about individual users;

access the requested element webservice and cause the element webservices to generate the requested content to be delivered in the content deliverable, wherein the content from a given element webservice includes a portion of an email, a product description, an image, or another element of a communication with the user;

if the request is for a single element webservice, deliver the data in the element webservice to the platform making the request in the pregenerated template;

if the request is for a pageless content deliverable, determine the optimal order of elements and which elements are best to contain in the deliverable, then order the elements in the generated template to create a pageless content deliverable and deliver the pageless content deliverable to the server making the request;

wherein the system draws information from the same element web services regardless of the type of communication generated;

wherein the system draws information from the same element webservices regardless of the type of platform from which the user is communicating.

2. The system of claim 1 which also incorporates a machine learning algorithm to incorporate past data into the future use of the specific order of elements webservices and appropriate elements to access.

3. The system of claim 1 also comprising an Asset Data Platform that comprises data, information, and images that can be drawn on by element webservices to create a given element.

4. The system of claim 1 wherein an element webservice has access to a database giving information on a user's propensities based on past behavior and predicted future behavior and creates an element based on those user propensities.

5. The system of claim 1 wherein an element webservice accesses data on a particular product and creates an element based on the particular product.

6. The system of claim 1 wherein an element webservice has access to a Customer Data Platform that provides identification of a user and attributes of that user and creates an element based on the information from the Customer Data Platform.

7. The system of claim 1 wherein an element webservice has access to any API which provides information needed to create a particular element to create a content deliverable.

8. A system for creating consistent personalized content to a user of a webservice across multiple channels and platforms of communication with the user, said system comprising:

a cache of element webservices stored in a computer readable non transitory medium linked to a network to provide accessibility to the other elements of the system;

wherein each element webservice comprises data and logic needed to build personalized content for a given element in real-time;

wherein each element webservice is capable of generating content applicable to multiple types of content deliverable customized to multiple offsite and onsite channels and platforms;

a layout structure, wherein said layout structure receives requests for content and generates an appropriate layout for content built by the element webservice to fill and provides said layout to the element webservices;

an image structure which receives requests for real time email content and generates image requests to be sent to the element webservices;

a customer attribute service containing information collected by the webservice on individual users;

instructions stored in a non-transitory computer medium which cause the system to take the following steps upon receiving a request for an individual element:

receive the request for an individual element at the layout structure;

create a template at the layout structure and provide said template to the customer attribute service and the element webservices;

cause the element webservices to generate the requested element and insert the element into the template created wherein the element from a given element webservice can be applied to multiple types of content deliverable;

provide the filled template to an appropriate API to fulfill the request;

instructions stored in a non-transitory computer medium which cause the system to take the following steps upon receiving a request for a multiple element experience;

receive the request for an individual element at the layout structure;

create a template at the layout structure by accessing information specific to a user and generating a template customized to the user making the request for a multiple element experience;

provide said template to the customer attribute service and the element webservices;

cause the element webservices to generate the requested elements and insert the elements into the template created wherein the element from a given element webservice can be applied to multiple types of content deliverable;

provide the filled template to an appropriate API to fulfill the request;

instructions stored in a non-transitory computer medium which cause the system to take the following steps upon receiving a request for real-time email content;

receive the request for real-time email content at the image structure;

provide an image and data on the request to the asset data platform and the element webservices;

cause the element web service to generate the requested element for an email and provide the requested element and email images to the asset data platform wherein the element from a given element webservice can be applied to multiple types of content deliverable;

provide the requested real-time email content, including the image and generated element to the user interface in real-time as the user opens an email.

9. The system of claim 8 wherein the layout structure further comprises:

a layout endpoint which receives a request for a content deliverable;

a layout decision structure which receives the request for a content deliverable from the layout endpoint, collects information, and accesses logic structures to create a layout for a content deliverable;

a configuration program containing instructions on how to generate an appropriate layout for a given content deliverable;

a viewport detection structure which detects the size of a viewscreen upon which the request will be viewed and ensures that the layout is the appropriate size.

10. The system of claim 9 wherein the configuration program further comprises a machine learning structure which is used to generate an appropriate layout for a given content deliverable.

11. The system of claim 9 wherein the layout structure further has access to external data sources, such as a customer information service or customer database platform; and wherein the layout structure accesses the external data source to contribute to the creation of a layout which is tailored to the user making the request for a content deliverable.

12. The system of claim 8 wherein each element webservice further has access to machine learning programs and external services such as a customer data platform (CDP) which allow it to create personalized content deliverables to a template from the layout structure.

13. A method for creating consistent personalized content to a user of a webservice across multiple channels and platforms of communication with the user, said method comprising:
- providing a cache of element webservices, wherein each element webservice comprises data and logic needed to build personalized content for a given element in real-time;
- wherein each element webservice is capable of generating content applicable to multiple types of content deliverable customized to multiple offsite and onsite channels and platforms;
- receiving a request for a content deliverable;
- creating an appropriate layout for the content deliverable, wherein the layout contains space for information for each requested element;
- generating the requested content from the element webservices, wherein each element webservice uses the data and logic it contains to build personalized content for a given element in real time;
- inserting the requested content from the element webservices into the layout, creating a finished content deliverable;
- wherein upon receiving an additional request from a previous user from a different platform or channel, the system will draw from the same element webservices to create content, providing a unified response to the user across different platforms and channels;
- providing the content deliverable to the requesting user.

14. The method of claim 13 also comprising the step of determining an optimal order of elements and which elements are best to contain in the deliverable, then further ordering the elements in the proper order and delivering the content.

15. The method of claim 13 also comprising the step of accessing a machine-learning program while creating the layout, allowing for the system to create content layouts and utilize both past and training layouts to create an appropriate layout for a given user.

16. The method of claim 13 wherein each element webservice also has access to machine learning systems, allowing each element webservice to create personalized content using information on the past creation of personalized content and projected user responses to created content to factor into the creation of a content deliverable.

* * * * *